(12) United States Patent
Ly et al.

(10) Patent No.: US 10,849,011 B2
(45) Date of Patent: Nov. 24, 2020

(54) RACH PROCEDURES USING MULTIPLE PRACH TRANSMISSIONS

(71) Applicant: QUALCOMM Incorporated, San Diego, CA (US)

(72) Inventors: Hung Ly, San Diego, CA (US); Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/614,320

(22) Filed: Jun. 5, 2017

(65) Prior Publication Data
US 2018/0109976 A1 Apr. 19, 2018

Related U.S. Application Data

(60) Provisional application No. 62/408,453, filed on Oct. 14, 2016.

(51) Int. Cl.
*H04W 28/04* (2009.01)
*H04L 1/08* (2006.01)
(Continued)

(52) U.S. Cl.
CPC .............. *H04W 28/04* (2013.01); *H04L 1/00* (2013.01); *H04L 1/005* (2013.01); *H04L 1/08* (2013.01);
(Continued)

(58) Field of Classification Search
CPC .. H04B 7/2606; H04B 7/0408; H04B 7/0421; H04B 7/0695; H04B 7/15528;
(Continued)

(56) References Cited

U.S. PATENT DOCUMENTS

2009/0252125 A1\* 10/2009 Vujcic ............... H04W 56/0045
370/336
2009/0259910 A1 10/2009 Lee et al.
(Continued)

FOREIGN PATENT DOCUMENTS

EP 2849483 A1 3/2015
EP 3128693 A1 2/2017
WO WO-2015161463 A1 10/2015

OTHER PUBLICATIONS

ISA/EP, International Search Report and Written Opinion of the International Searching Authority, Int'l Application No. PCT/US2017/054500, dated Dec. 13, 2017, European Patent Office, Rijswijk, NL, 14 pgs.

(Continued)

*Primary Examiner* — Yemane Mesfin
*Assistant Examiner* — Mon Cheri S Davenport
(74) *Attorney, Agent, or Firm* — Holland & Hart LLP/Qualcomm

(57) ABSTRACT

Techniques are described herein to improve a link budget of physical random access channel (PRACH) transmissions used during a random access (RACH) procedure. The link budget of a PRACH transmission associated with the RACH procedure may be improved by transmitting multiple PRACH transmissions. The multiple PRACH transmissions may be combined to achieve some combining gain. Each retransmission of a PRACH transmission may be done at a higher power level than the previous PRACH transmission. If UE receives an indication that a target base station failed to successfully decode the PRACH transmission, the UE may retransmit the PRACH transmission but at a higher power level than the initial PRACH transmission. PRACH transmissions may be distributed across multiple slots. PRACH transmissions may be distributed across multiple (Continued)

frequency sub-bands in the same slot or across frequency sub-bands in the different slots.

33 Claims, 25 Drawing Sheets

(51) Int. Cl.
*H04L 1/18* (2006.01)
*H04L 5/00* (2006.01)
*H04L 1/00* (2006.01)
*H04W 72/04* (2009.01)
*H04W 72/12* (2009.01)
*H04W 74/08* (2009.01)

(52) U.S. Cl.
CPC .......... *H04L 1/1893* (2013.01); *H04L 5/0053* (2013.01); *H04W 72/0413* (2013.01); *H04W 72/1205* (2013.01); *H04W 74/0808* (2013.01); *H04W 74/0833* (2013.01); *H04L 5/0007* (2013.01)

(58) Field of Classification Search
CPC ... H04L 5/0023; H04L 5/0041; H04L 5/0051; H04L 5/0053; H04L 5/0082; H04L 5/0092; H04L 2027/0095; H04L 27/2613; H04L 27/2692; H04L 5/001; H04L 5/0032; H04L 5/0048; H04W 84/047; H04W 24/00; H04W 48/18; H04W 16/14; H04W 72/0446; H04W 72/046; H04W 74/002; H04W 74/006; H04W 74/0808; H04W 74/0833; H04W 76/15; H04W 88/08

See application file for complete search history.

(56) References Cited

U.S. PATENT DOCUMENTS

2010/0041428 A1 2/2010 Chen et al.
2015/0092740 A1* 4/2015 Li .................. H04L 1/1887
 370/330
2015/0365977 A1* 12/2015 Tabet .................. H04J 13/0062
 13/62

OTHER PUBLICATIONS

European Search Report—EP19209089—Search Authority—The Hague—dated Jan. 3, 2020.
European Search Report—EP19209099—Search Authority—The Hague—dated Jan. 2, 2020.
Fujitsu: "The impacts on RAR caused by preamble repetition," 3GPP Draft; R1-151565—The Impacts on Rar Caused by Preamble Repetition—Final, 3rd Generation Partnership Project (3GPP), Mobile Competence Centre ; 650t Route Des Lucioles ; F-06921 Sophia-Antipolis C, vol. RAN WG1t No. Belgrade, Serbia; Apr. 20, 2015-Apr. 24, 2015 Apr. 19, 2015 (Apr. 19, 2015), XP050934437, Retrieved from the Internet: URL: https://www.3gpp.org/ftp/tsg_ran/WG1_RL1/TSGR1_80b/Docs/[retrieved on Apr. 19, 2015] Section 2, 3 pages.

* cited by examiner

RACH PROCEDURES USING MULTIPLE PRACH TRANSMISSIONS

CROSS REFERENCES

The present application for patent claims priority to U.S. Provisional Patent Application No. 62/408,453 by LY, et al., entitled "RACH PROCEDURES USING MULTIPLE PRACH TRANSMISSIONS," filed Oct. 14, 2016, assigned to the assignee hereof.

INTRODUCTION

The following relates generally to wireless communication, and more specifically to random access channel (RACH) procedures using multiple physical random access channel (PRACH) transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

As a UE moves through a wireless communications system's coverage area, the UE may need to establish communication links with various base stations and/or cells in the wireless communications system. To establish those communication links, a random access procedure or a handover procedure may be initiated. The smaller the geographic area served by a cell or base station, the more random access or handover procedures may need to be initiated.

SUMMARY

A method of wireless communication is described. The method may include identifying that a first physical random access channel (PRACH) transmission received at a first reception time is unable to be decoded, the first PRACH message comprising a first control message, receiving a second PRACH transmission at a second reception time based at least in part on identifying the undecoded first PRACH transmission, the second PRACH message comprising a second control message, identifying a common message portion present in both the first PRACH transmission and the second PRACH transmission based at least in part on the first control message and the second control message, determining a fixed timing between the first PRACH transmission and the second PRACH transmission based at least in part on the first reception time and the second reception time, and extracting data that is common to both the first PRACH transmission and the second PRACH transmission based at least in part on the common message portion and the fixed timing.

An apparatus for wireless communication is described. The apparatus may include means for identifying that a first physical random access channel (PRACH) transmission received at a first reception time is unable to be decoded, the first PRACH message comprising a first control message, means for receiving a second PRACH transmission at a second reception time based at least in part on identifying the undecoded first PRACH transmission, the second PRACH message comprising a second control message, means for identifying a common message portion present in both the first PRACH transmission and the second PRACH transmission based at least in part on the first control message and the second control message, means for determining a fixed timing between the first PRACH transmission and the second PRACH transmission based at least in part on the first reception time and the second reception time, and means for extracting data that is common to both the first PRACH transmission and the second PRACH transmission based at least in part on the common message portion and the fixed timing.

Another apparatus for wireless communication is described. The apparatus may include a processor, memory in electronic communication with the processor, and instructions stored in the memory. The instructions may be operable to cause the processor to identify that a first physical random access channel (PRACH) transmission received at a first reception time is unable to be decoded, the first PRACH message comprising a first control message, receive a second PRACH transmission at a second reception time based at least in part on identifying the undecoded first PRACH transmission, the second PRACH message comprising a second control message, identify a common message portion present in both the first PRACH transmission and the second PRACH transmission based at least in part on the first control message and the second control message, determine a fixed timing between the first PRACH transmission and the second PRACH transmission based at least in part on the first reception time and the second reception time, and extract data that is common to both the first PRACH transmission and the second PRACH transmission based at least in part on the common message portion and the fixed timing.

A non-transitory computer readable medium for wireless communication is described. The non-transitory computer-readable medium may include instructions operable to cause a processor to identify that a first physical random access channel (PRACH) transmission received at a first reception time is unable to be decoded, the first PRACH message comprising a first control message, receive a second PRACH transmission at a second reception time based at least in part on identifying the undecoded first PRACH transmission, the second PRACH message comprising a second control message, identify a common message portion present in both the first PRACH transmission and the second PRACH transmission based at least in part on the first control message and the second control message, determine a fixed timing between the first PRACH transmission and the second PRACH transmission based at least in part on the first reception time and the second reception time, and extract data that is common to both the first PRACH transmission and the second PRACH transmission based at least in part on the common message portion and the fixed timing.

Some examples of the method, apparatus, and non-transitory computer-readable medium described above may further include processes, features, means, or instructions for initiating a contention-free random access procedure, wherein extracting the data may be based at least in part on initiating the contention-free random access procedure.

Some examples of the method, apparatus, and non-transitory computer-readable medium described above may further include processes, features, means, or instructions for generating a combined PRACH control message based at least in part on the first PRACH transmission, the second PRACH transmission, the common portion, and the fixed timing, wherein extracting the data may be based at least in part on the combined PRACH control message.

In some examples of the method, apparatus, and non-transitory computer-readable medium described above, identifying the common message portion further comprises: determining that the first PRACH transmission may be the same as the second PRACH transmission.

In some examples of the method, apparatus, and non-transitory computer-readable medium described above, identifying the common message portion further comprises: determining that a type of the first PRACH transmission may be the same as a type of the second PRACH transmission, wherein extracting the data may be based at least in part on the determining.

In some examples of the method, apparatus, and non-transitory computer-readable medium described above, identifying the common message portion further comprises: identifying a location of the first control message in the first PRACH transmission. Some examples of the method, apparatus, and non-transitory computer-readable medium described above may further include processes, features, means, or instructions for identifying a location of the second control message in the second PRACH transmission, wherein extracting the data may be based at least in part on the location of the first control message being the same as the location of the second control message.

Some examples of the method, apparatus, and non-transitory computer-readable medium described above may further include processes, features, means, or instructions for identifying a number of received PRACH transmissions. Some examples of the method, apparatus, and non-transitory computer-readable medium described above may further include processes, features, means, or instructions for terminating the RACH procedure based at least in part on the number of received PRACH transmissions being equal to or greater than a threshold number of PRACH transmissions.

Some examples of the method, apparatus, and non-transitory computer-readable medium described above may further include processes, features, means, or instructions for initiating a random access (RACH) procedure to establish a communication link between a user equipment (UE) and a cell of a base station. Some examples of the method, apparatus, and non-transitory computer-readable medium described above may further include processes, features, means, or instructions for transmitting a PRACH transmission schedule having a plurality of PRACH transmission opportunities based at least in part on the initiating, wherein extracting the data may be based at least in part on the PRACH transmission schedule.

Some examples of the method, apparatus, and non-transitory computer-readable medium described above may further include processes, features, means, or instructions for extracting the data may be based at least in part on the UE being in a radio resource control (RRC) active state.

In some examples of the method, apparatus, and non-transitory computer-readable medium described above, the first PRACH transmission or the second PRACH transmission may be mapped into one or more self-contained uplink slots.

In some examples of the method, apparatus, and non-transitory computer-readable medium described above, the first PRACH transmission and the second PRACH transmission may be based at least in part on an outer loop power control.

In some examples of the method, apparatus, and non-transitory computer-readable medium described above, a transmission power of the second PRACH transmission may be greater than a transmission power of the first PRACH transmission.

Some examples of the method, apparatus, and non-transitory computer-readable medium described above may further include processes, features, means, or instructions for receiving a third PRACH transmission based at least in part on the second PRACH transmission failing to be decoded.

A method of wireless communication is described. The method may include transmitting a physical random access channel (PRACH) transmission having a message portion at a first time, receiving an indication that the PRACH transmission failed to be successfully decoded, determining a fixed timing between the first time associated with the transmission of the PRACH transmission and a second time associated with a retransmission of the PRACH transmission, and retransmitting the PRACH transmission based at least in part on the fixed timing.

An apparatus for wireless communication is described. The apparatus may include means for transmitting a physical random access channel (PRACH) transmission having a message portion at a first time, means for receiving an indication that the PRACH transmission failed to be successfully decoded, means for determining a fixed timing between the first time associated with the transmission of the PRACH transmission and a second time associated with a retransmission of the PRACH transmission, and means for retransmitting the PRACH transmission based at least in part on the fixed timing.

Another apparatus for wireless communication is described. The apparatus may include a processor, memory in electronic communication with the processor, and instructions stored in the memory. The instructions may be operable to cause the processor to transmit a physical random access channel (PRACH) transmission having a message portion at a first time, receive an indication that the PRACH transmission failed to be successfully decoded, determine a fixed timing between the first time associated with the transmission of the PRACH transmission and a second time associated with a retransmission of the PRACH transmission, and retransmit the PRACH transmission based at least in part on the fixed timing.

A non-transitory computer readable medium for wireless communication is described. The non-transitory computer-readable medium may include instructions operable to cause a processor to transmit a physical random access channel (PRACH) transmission having a message portion at a first time, receive an indication that the PRACH transmission failed to be successfully decoded, determine a fixed timing between the first time associated with the transmission of the PRACH transmission and a second time associated with a retransmission of the PRACH transmission, and retransmit the PRACH transmission based at least in part on the fixed timing.

Some examples of the method, apparatus, and non-transitory computer-readable medium described above may further include processes, features, means, or instructions for mapping the first PRACH transmission and the second PRACH transmission to one or more uplink-centric slots.

Some examples of the method, apparatus, and non-transitory computer-readable medium described above may further include processes, features, means, or instructions for receiving a transmission schedule that includes a plurality of PRACH transmission opportunities associated with the RACH procedure. Some examples of the method, apparatus, and non-transitory computer-readable medium described above may further include processes, features, means, or instructions for transmitting the first PRACH transmission and the second PRACH transmission based at least in part on the transmission schedule.

Some examples of the method, apparatus, and non-transitory computer-readable medium described above may further include processes, features, means, or instructions for determining that the PRACH transmission was not decoded successfully based at least in part on an absence of the indication, wherein retransmitting the PRACH transmission may be based at least in part on the determining.

A method of wireless communication is described. The method may include initiating a random access (RACH) procedure to establish a communication link between a user equipment (UE) and a base station, transmitting, by the UE, a physical random access channel (PRACH) transmission via a first set of communication resources, the first PRACH transmission being associated with the RACH procedure, and retransmitting, by the UE, the PRACH transmission via a second set of communication resources different from the first set of communication resources.

An apparatus for wireless communication is described. The apparatus may include means for initiating a random access (RACH) procedure to establish a communication link between a user equipment (UE) and a base station, means for transmitting, by the UE, a physical random access channel (PRACH) transmission via a first set of communication resources, the first PRACH transmission being associated with the RACH procedure, and means for retransmitting, by the UE, the PRACH transmission via a second set of communication resources different from the first set of communication resources.

Another apparatus for wireless communication is described. The apparatus may include a processor, memory in electronic communication with the processor, and instructions stored in the memory. The instructions may be operable to cause the processor to initiate a random access (RACH) procedure to establish a communication link between a user equipment (UE) and a base station, transmit, by the UE, a physical random access channel (PRACH) transmission via a first set of communication resources, the first PRACH transmission being associated with the RACH procedure, and retransmit, by the UE, the PRACH transmission via a second set of communication resources different from the first set of communication resources.

A non-transitory computer readable medium for wireless communication is described. The non-transitory computer-readable medium may include instructions operable to cause a processor to initiate a random access (RACH) procedure to establish a communication link between a user equipment (UE) and a base station, transmit, by the UE, a physical random access channel (PRACH) transmission via a first set of communication resources, the first PRACH transmission being associated with the RACH procedure, and retransmit, by the UE, the PRACH transmission via a second set of communication resources different from the first set of communication resources.

In some examples of the method, apparatus, and non-transitory computer-readable medium described above, the first set of communication resources may be a first uplink slot and the second set of communication resources may be a second uplink slot that may be different from the first uplink slot.

Some examples of the method, apparatus, and non-transitory computer-readable medium described above may further include processes, features, means, or instructions for mapping the PRACH transmission to one or more uplink-centric slots.

In some examples of the method, apparatus, and non-transitory computer-readable medium described above, the first set of communication resources may be a first frequency sub-band of a slot and the second set of communication resources may be second frequency sub-band of the slot, the second frequency sub-band being different from the first frequency sub-band.

In some examples of the method, apparatus, and non-transitory computer-readable medium described above, the first set of communication resources comprises a first slot and a first frequency sub-band of the first slot. In some examples of the method, apparatus, and non-transitory computer-readable medium described above, the second set of communication resources comprises a second slot different from the first slot and a second frequency sub-band of the second slot different from the first frequency sub-band.

Some examples of the method, apparatus, and non-transitory computer-readable medium described above may further include processes, features, means, or instructions for receiving an indication from the base station indicating that the PRACH transmission may have been decoded successfully. Some examples of the method, apparatus, and non-transitory computer-readable medium described above may further include processes, features, means, or instructions for terminating RACH procedure based at least in part on the PRACH transmission being decoded successfully.

Some examples of the method, apparatus, and non-transitory computer-readable medium described above may further include processes, features, means, or instructions for linking a first PRACH transmission and a second PRACH transmission such that the base station may be configured to combine the first PRACH transmission and the second PRACH transmission.

Some examples of the method, apparatus, and non-transitory computer-readable medium described above may further include processes, features, means, or instructions for receiving a transmission schedule that includes a plurality of PRACH transmission opportunities associated with the RACH procedure. Some examples of the method, apparatus, and non-transitory computer-readable medium described above may further include processes, features, means, or instructions for transmitting a PRACH transmission during each PRACH transmission opportunity in the transmission schedule.

A method of wireless communication is described. The method may include initiating a random access (RACH) procedure to establish a communication link between a user equipment (UE) and a base station, receiving a plurality of identical physical random access channel (PRACH) transmissions, the PRACH transmissions being associated with the RACH procedure, each PRACH transmission being received via different communication resources, extracting data included in the PRACH transmissions, and terminating the RACH procedure based at least in part on extracting the data from the PRACH transmissions.

An apparatus for wireless communication is described. The apparatus may include means for initiating a random access (RACH) procedure to establish a communication link between a user equipment (UE) and a base station, means for receiving a plurality of identical physical random access channel (PRACH) transmissions, the PRACH transmissions being associated with the RACH procedure, each PRACH transmission being received via different communication resources, means for extracting data included in the PRACH transmissions, and means for terminating the RACH procedure based at least in part on extracting the data from the PRACH transmissions.

Another apparatus for wireless communication is described. The apparatus may include a processor, memory in electronic communication with the processor, and instructions stored in the memory. The instructions may be operable to cause the processor to initiate a random access (RACH) procedure to establish a communication link between a user equipment (UE) and a base station, receive a plurality of identical physical random access channel (PRACH) transmissions, the PRACH transmissions being associated with the RACH procedure, each PRACH transmission being received via different communication resources, extract data included in the PRACH transmissions, and terminate the RACH procedure based at least in part on extracting the data from the PRACH transmissions.

A non-transitory computer readable medium for wireless communication is described. The non-transitory computer-readable medium may include instructions operable to cause a processor to initiate a random access (RACH) procedure to establish a communication link between a user equipment (UE) and a base station, receive a plurality of identical physical random access channel (PRACH) transmissions, the PRACH transmissions being associated with the RACH procedure, each PRACH transmission being received via different communication resources, extract data included in the PRACH transmissions, and terminate the RACH procedure based at least in part on extracting the data from the PRACH transmissions.

Some examples of the method, apparatus, and non-transitory computer-readable medium described above may further include processes, features, means, or instructions for identifying a number of received PRACH transmissions, wherein terminating the RACH procedure may be based at least in part on the number of received PRACH transmissions being equal to or greater than a threshold number of PRACH transmissions.

Some examples of the method, apparatus, and non-transitory computer-readable medium described above may further include processes, features, means, or instructions for generating an RACH response message based at least in part on extracting data included in the PRACH transmissions. Some examples of the method, apparatus, and non-transitory computer-readable medium described above may further include processes, features, means, or instructions for transmitting the RACH response message.

In some examples of the method, apparatus, and non-transitory computer-readable medium described above, extracting the data further comprises: extracting data from one of the plurality of identical PRACH transmissions received.

Some examples of the method, apparatus, and non-transitory computer-readable medium described above may further include processes, features, means, or instructions for generating a combined PRACH control message based at least in part on the plurality of identical PRACH transmissions received, wherein extracting the data may be based at least in part on the combined PRACH control message.

A method of wireless communication is described. The method may include identifying that a first physical random access channel (PRACH) transmission received at a first reception time failed to be successfully decoded, the first PRACH message comprising a first control message, receiving a second PRACH transmission at a second reception time based at least in part on identifying the first PRACH transmission has failed to be successfully decoded, the second PRACH message comprising a second control message, identifying a common message portion present in both the first PRACH transmission and the second PRACH transmission based at least in part on the first control message and the second control message, determining a fixed timing between the first PRACH transmission and the second PRACH transmission based at least in part on the first reception time and the second reception time, extracting data that is common to both the first PRACH transmission and the second PRACH transmission based at least in part on the common message portion and the fixed timing, and generating a combined PRACH control message.

An apparatus for wireless communication is described. The apparatus may include means for identifying that a first physical random access channel (PRACH) transmission received at a first reception time failed to be successfully decoded, the first PRACH message comprising a first control message, means for receiving a second PRACH transmission at a second reception time based at least in part on identifying the first PRACH transmission has failed to be successfully decoded, the second PRACH message comprising a second control message, means for identifying a common message portion present in both the first PRACH transmission and the second PRACH transmission based at least in part on the first control message and the second control message, means for determining a fixed timing between the first PRACH transmission and the second PRACH transmission based at least in part on the first reception time and the second reception time, means for extracting data that is common to both the first PRACH transmission and the second PRACH transmission based at least in part on the common message portion and the fixed timing, and means for generating a combined PRACH control message.

Another apparatus for wireless communication is described. The apparatus may include a processor, memory in electronic communication with the processor, and instructions stored in the memory. The instructions may be operable to cause the processor to identify that a first physical random access channel (PRACH) transmission received at a first reception time failed to be successfully decoded, the first PRACH message comprising a first control message, receive a second PRACH transmission at a second reception time based at least in part on identifying the first PRACH transmission has failed to be successfully decoded, the second PRACH message comprising a second control message, identify a common message portion present in both the first PRACH transmission and the second PRACH transmission based at least in part on the first control message and the second control message, determine a fixed timing between the first PRACH transmission and the second PRACH transmission based at least in part on the first reception time and the second reception time, extract data that is common to both the first PRACH transmission and the second PRACH transmission based at least in part on the common message portion and the fixed timing, and generate a combined PRACH control message.

A non-transitory computer readable medium for wireless communication is described. The non-transitory computer-readable medium may include instructions operable to cause a processor to identify that a first physical random access channel (PRACH) transmission received at a first reception time failed to be successfully decoded, the first PRACH message comprising a first control message, receive a second PRACH transmission at a second reception time based at least in part on identifying the first PRACH transmission has failed to be successfully decoded, the second PRACH message comprising a second control message, identify a common message portion present in both the first PRACH transmission and the second PRACH transmission based at least in part on the first control message and the second control message, determine a fixed timing between the first PRACH transmission and the second PRACH transmission based at least in part on the first reception time and the second reception time, extract data that is common to both the first PRACH transmission and the second PRACH transmission based at least in part on the common message portion and the fixed timing, and generate a combined PRACH control message.

Some examples of the method, apparatus, and non-transitory computer-readable medium described above may further include processes, features, means, or instructions for initiating a contention-free random access procedure, wherein extracting the data may be based at least in part on initiating the contention-free random access procedure.

Some examples of the method, apparatus, and non-transitory computer-readable medium described above may further include processes, features, means, or instructions for generating the combined PRACH control message may be based at least in part on the first PRACH transmission, the second PRACH transmission, the common portion, and the fixed timing, wherein extracting the data may be based at least in part on the combined PRACH control message.

In some examples of the method, apparatus, and non-transitory computer-readable medium described above, identifying the common message portion further comprises: determining that the first PRACH transmission may be the same as the second PRACH transmission.

In some examples of the method, apparatus, and non-transitory computer-readable medium described above, identifying the common message portion further comprises: determining that a type of the first PRACH transmission may be the same as a type of the second PRACH transmission, wherein extracting the data may be based at least in part on the determining.

Some examples of the method, apparatus, and non-transitory computer-readable medium described above may further include processes, features, means, or instructions for identifying the common message portion further comprises identifying a location of the first control message in the first PRACH transmission. In some examples of the method, apparatus, and non-transitory computer-readable medium described above, the method further comprising identifying a location of the second control message in the second PRACH transmission, wherein extracting the data may be based at least in part on the location of the first control message being the same as the location of the second control message.

Some examples of the method, apparatus, and non-transitory computer-readable medium described above may further include processes, features, means, or instructions for identifying a number of received PRACH transmissions. Some examples of the method, apparatus, and non-transitory computer-readable medium described above may further include processes, features, means, or instructions for terminating the RACH procedure based at least in part on the number of received PRACH transmissions being equal to or greater than a threshold number of PRACH transmissions.

Some examples of the method, apparatus, and non-transitory computer-readable medium described above may further include processes, features, means, or instructions for initiating a random access (RACH) procedure to establish a communication link between a user equipment (UE) and a cell of a base station. Some examples of the method, apparatus, and non-transitory computer-readable medium described above may further include processes, features, means, or instructions for transmitting a PRACH transmission schedule having a plurality of PRACH transmission opportunities based at least in part on the initiating, wherein extracting the data may be based at least in part on the PRACH transmission schedule.

Some examples of the method, apparatus, and non-transitory computer-readable medium described above may further include processes, features, means, or instructions for extracting the data may be based at least in part on the UE being in a radio resource control (RRC) active state.

In some examples of the method, apparatus, and non-transitory computer-readable medium described above, the first PRACH transmission or the second PRACH transmission may be mapped into one or more self-contained uplink slots.

In some examples of the method, apparatus, and non-transitory computer-readable medium described above, the first PRACH transmission and the second PRACH transmission may be based at least in part on an outer loop power control.

In some examples of the method, apparatus, and non-transitory computer-readable medium described above, a transmission power of the second PRACH transmission may be greater than a transmission power of the first PRACH transmission.

Some examples of the method, apparatus, and non-transitory computer-readable medium described above may further include processes, features, means, or instructions for receiving a third PRACH transmission based at least in part on the second PRACH transmission failing to be successfully decoded.

In some examples of the method, apparatus, and non-transitory computer-readable medium described above, the combined PRACH control message may be based at least in part on the first PRACH transmission received during a first uplink slot and the second PRACH transmission received during a second uplink slot different from the first uplink slot.

A method of wireless communication is described. The method may include identifying that a first physical random access channel (PRACH) transmission received at a first reception time failed to be successfully decoded, receiving a second PRACH transmission at a second reception time based at least in part on identifying the first PRACH transmission has failed to be successfully decoded, determining a fixed timing between the first PRACH transmission and the second PRACH transmission based at least in part on the first reception time and the second reception time, and generating a combined PRACH control message is based at least in part on the first PRACH transmission, the second PRACH transmission, and the fixed timing.

An apparatus for wireless communication is described. The apparatus may include means for identifying that a first physical random access channel (PRACH) transmission received at a first reception time failed to be successfully decoded, means for receiving a second PRACH transmission at a second reception time based at least in part on identifying the first PRACH transmission has failed to be successfully decoded, means for determining a fixed timing between the first PRACH transmission and the second PRACH transmission based at least in part on the first reception time and the second reception time, and means for generating a combined PRACH control message is based at least in part on the first PRACH transmission, the second PRACH transmission, and the fixed timing.

Another apparatus for wireless communication is described. The apparatus may include a processor, memory in electronic communication with the processor, and instructions stored in the memory. The instructions may be operable to cause the processor to identify that a first physical random access channel (PRACH) transmission received at a first reception time failed to be successfully decoded, receive a second PRACH transmission at a second reception time based at least in part on identifying the first PRACH transmission has failed to be successfully decoded, determine a fixed timing between the first PRACH transmission and the second PRACH transmission based at least in part on the first reception time and the second reception time, and generate a combined PRACH control message is based at least in part on the first PRACH transmission, the second PRACH transmission, and the fixed timing.

A non-transitory computer readable medium for wireless communication is described. The non-transitory computer-readable medium may include instructions operable to cause a processor to identify that a first physical random access channel (PRACH) transmission received at a first reception time failed to be successfully decoded, receive a second PRACH transmission at a second reception time based at least in part on identifying the first PRACH transmission has failed to be successfully decoded, determine a fixed timing between the first PRACH transmission and the second PRACH transmission based at least in part on the first reception time and the second reception time, and generate a combined PRACH control message is based at least in part on the first PRACH transmission, the second PRACH transmission, and the fixed timing.

Some examples of the method, apparatus, and non-transitory computer-readable medium described above may further include processes, features, means, or instructions for extracting data that may be common to both the first PRACH transmission and the second PRACH transmission based at least in part on the fixed timing.

Some examples of the method, apparatus, and non-transitory computer-readable medium described above may further include processes, features, means, or instructions for initiating a contention-free random access procedure, wherein generating the combined PRACH control message may be based at least in part on initiating the contention-free random access procedure.

Some examples of the method, apparatus, and non-transitory computer-readable medium described above may further include processes, features, means, or instructions for identifying a common message portion present in both the first PRACH transmission and the second PRACH transmission based at least in part on the first control message and the second control message.

In some examples of the method, apparatus, and non-transitory computer-readable medium described above, identifying the common message portion further comprises: determining that the first PRACH transmission may be the same as the second PRACH transmission.

In some examples of the method, apparatus, and non-transitory computer-readable medium described above, identifying the common message portion further comprises: determining that a type of the first PRACH transmission may be the same as a type of the second PRACH transmission, wherein generating the combined PRACH control message may be based at least in part on the determining.

Some examples of the method, apparatus, and non-transitory computer-readable medium described above may further include processes, features, means, or instructions for identifying the common message portion further comprises identifying a location of the first control message in the first PRACH transmission. In some examples of the method, apparatus, and non-transitory computer-readable medium described above, the method further comprising identifying a location of the second control message in the second PRACH transmission, wherein generating the combined PRACH control message may be based at least in part on the location of the first control message being the same as the location of the second control message.

Some examples of the method, apparatus, and non-transitory computer-readable medium described above may further include processes, features, means, or instructions for identifying a number of received PRACH transmissions. Some examples of the method, apparatus, and non-transitory computer-readable medium described above may further include processes, features, means, or instructions for terminating the RACH procedure based at least in part on the number of received PRACH transmissions being equal to or greater than a threshold number of PRACH transmissions.

Some examples of the method, apparatus, and non-transitory computer-readable medium described above may further include processes, features, means, or instructions for initiating a random access (RACH) procedure to establish a communication link between a user equipment (UE) and a cell of a base station. Some examples of the method, apparatus, and non-transitory computer-readable medium described above may further include processes, features, means, or instructions for transmitting a PRACH transmission schedule having a plurality of PRACH transmission opportunities based at least in part on the initiating, wherein generating the combined PRACH control message may be based at least in part on the PRACH transmission schedule.

Some examples of the method, apparatus, and non-transitory computer-readable medium described above may further include processes, features, means, or instructions for generating the combined PRACH control message may be based at least in part on the UE being in a radio resource control (RRC) active state.

In some examples of the method, apparatus, and non-transitory computer-readable medium described above, the first PRACH transmission or the second PRACH transmission may be mapped into one or more self-contained uplink slots.

In some examples of the method, apparatus, and non-transitory computer-readable medium described above, the first PRACH transmission and the second PRACH transmission may be based at least in part on an outer loop power control.

In some examples of the method, apparatus, and non-transitory computer-readable medium described above, a transmission power of the second PRACH transmission may be greater than a transmission power of the first PRACH transmission.

Some examples of the method, apparatus, and non-transitory computer-readable medium described above may further include processes, features, means, or instructions for receiving a third PRACH transmission based at least in part on the second PRACH transmission failing to be successfully decoded.

In some examples of the method, apparatus, and non-transitory computer-readable medium described above, the combined PRACH control message may be based at least in part on the first PRACH transmission received during a first uplink slot and the second PRACH transmission received during a second uplink slot different from the first uplink slot.

DETAILED DESCRIPTION

Figure 1:
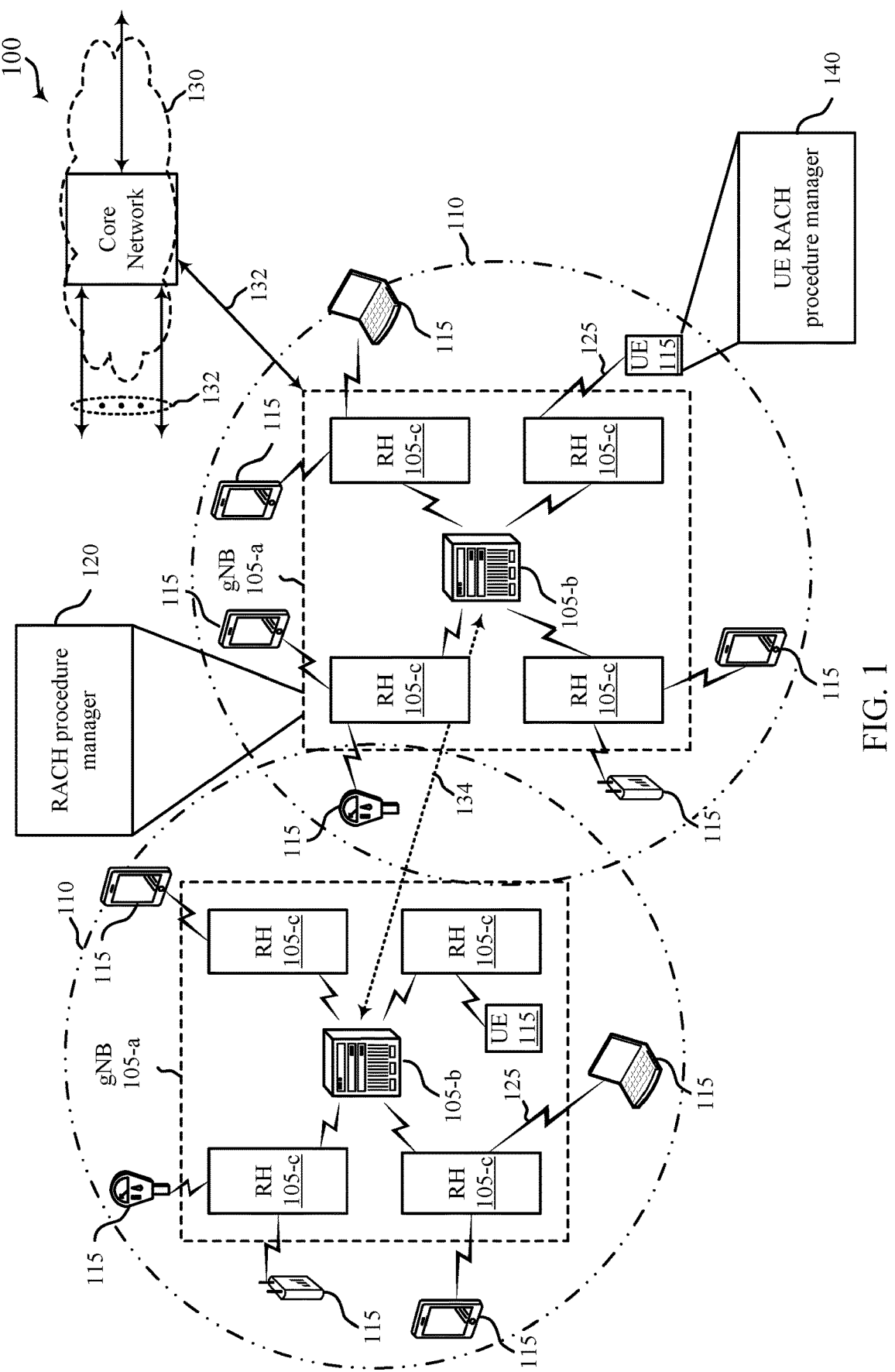
FIG. 1 illustrates an example of a system for wireless communication that supports RACH procedures using multiple PRACH transmissions in accordance with one or more aspects of the present disclosure.

Some wireless communications systems may use directional beams to establish a communication link between a UE and a base station. Such directional beams may serve a limited geographic area. As a UE moves through the wireless communications system, the UE may use RACH procedures or handover procedures to establish communication links with target directional beams, target cells, target zones, or target base stations. Consequently, techniques are described herein to improve a link budget of PRACH transmissions used during a RACH procedure or a handover procedure. The techniques are associated with uplink-based RACH procedures.

In some examples, the link budget for a PRACH transmission may be improved by combining multiple PRACH transmissions and retransmissions together to form a PRACH control message. For example, in some situations, multiple PRACH transmissions may be sent as part of a single RACH procedure between a UE and a target base station. If the target base station cannot decode the individual PRACH transmissions, the target base station may combine two or more PRACH transmissions associated with the RACH procedure and extract data based on the combined PRACH control message. In some instances, combining PRACH retransmissions is executed as part of a contention-free RACH procedure.

In some examples, the link budget for a PRACH transmission may be improved by retransmitting the PRACH transmission at a higher power based at least in part on feedback mechanisms. For example, after transmitting a PRACH transmission, the UE may receive an indication that the target base station failed to successfully decode the PRACH transmission. In such a situation, the UE may retransmit the PRACH transmission at a higher power level than that used to transmit the initial PRACH transmission. This process may be repeated until either the PRACH transmission is successfully decoded or until a maximum number of PRACH transmission attempts have been made. In some instances, the indication may terminate the RACH procedure after a PRACH message has been decoded. In some instances, retransmitting at a higher power level may be used in conjunction with combining multiple PRACH messages to form the combined PRACH control message.

In some examples, the link budget for a PRACH transmission may be improved by transmitting multiple PRACH transmissions using multiple communication resources. For example, PRACH transmissions may be transmitted over multiple uplink-centric slots. In other examples, PRACH transmission may be transmitted over multiple frequency sub-bands within the same slot. In some instances, multiple PRACH transmissions may be outlined in a transmission schedule of a contention-free handover procedure. In some instances, using either time-based resources or frequency-based resources may be part of either a contention-free RACH procedure or a contention-based RACH procedure.

Aspects of the disclosure are initially described in the context of a wireless communications system. Aspects of the disclosure are illustrated by and described with reference to communication schemes and resource structures. Aspects of the disclosure are further illustrated by and described with reference to apparatus diagrams, system diagrams, and flowcharts that relate to RACH procedures using multiple PRACH transmissions.

FIG. 1 illustrates an example of a wireless communication system 100, in accordance with various aspects of the disclosure. The wireless communication system 100 may include network devices 105 (e.g., gNodeBs (gNBs), and/or radio heads (RHs)), UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communication system 100 may support multiple PRACH transmissions during a RACH procedure to improve the link budget of the PRACH transmissions. For example, wireless communication system 100 may support combining a plurality of PRACH transmissions into a PRACH control message to improve the link budget.

A core network 130 may provide user authentication, access authorization, tracking, Internet Protocol (IP) connectivity, and other access, routing, or mobility functions. At least some of the network devices 105 (e.g., network device 105-$a$, which may be an example of a LTE eNB, an eLTE eNB, an NR gNB, an NR Node-B, an NR access node or a base station, network device 105-$b$, which may be an example of an access node controller (ANC), or a centralized unit) may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-$b$ may communicate, either directly or indirectly (e.g., through core network 130), with each other over backhaul links 134 (e.g., X1, X2, Xn etc.), which may be wired or wireless communication links.

Each network device 105-$b$ may also communicate with a number of UEs 115 through a number of other network devices 105-$c$, where network device 105-$c$ may be an example of a transmission reception point (TRP), a distributed unit (DU), a radio head (RH), a remote radio head (RRH), or a smart radio head. In alternative configurations, various functions of each network device 105 may be distributed across various network devices 105 (e.g., radio heads/distributed units and access network controllers/centralized units) or consolidated into a single network device 105 (e.g., a base station/an access node).

The wireless communication system 100 may support synchronous or asynchronous operation. For synchronous operation, the network devices 105-$a$ and/or network devices 105-$c$ may have similar frame timing, and transmissions from different network devices 105-$a$ and/or network devices 105-$c$ may be approximately aligned in time. For asynchronous operation, the network devices 105-$a$ and/or network devices 105-$c$ may have different frame timings, and transmissions from different network devices 105-$a$ and/or network devices 105-$c$ may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or one of the layer 2 protocol stack (e.g. Packet Data Convergence Protocol (PDCP)) may be IP-based. One of the layer 2 protocol stack (e.g. PDCP, Radio Link Control (RLC) or Medium Access Control (MAC)) may in some cases perform packet segmentation and reassembly to communicate over logical channels. One of the layer 2 protocol stack (e.g. A Medium Access Control (MAC)) may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-$c$, network device 105-$b$, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, a smart phone, a smart watch, a customer premises equipment (CPE) or the like. A UE 115 may be able to communicate with various types of network devices 105-$a$, network devices 105-$c$, base stations, access points, or other network devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a network device 105, and/or DL channels, from a network device 105 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a TTI of a downlink channel may be distributed between different control regions in a cascaded manner (e.g., between a common control region and one or more UE-specific control regions).

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

Wireless communication system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length, and systems that use this region may be referred to as millimeter wave (mmWave) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

As indicated above, wireless communication system 100 may be used for communicating information over a number of different services. Such services may include, for example, data services in which relatively large amounts of data are transmitted over communication links 125. Such data services may be used to transmit voice, video, or other data. In some cases, data services may include an enhanced Mobile Broadband (eMBB) service. Wireless communication system 100 may also provide Ultra-Reliable and Low-Latency Communications (URLLC) services, which may provide low latency services with high reliability as may be desired in certain applications (e.g., remote control, wireless automation of production facilities, vehicular traffic efficiency and safety, mobile gaming, etc.). Wireless communication system 100 may also provide massive Machine-Type Communications (mMTC) services, in which UEs 115 may be incorporated into other devices (e.g., meters, vehicles, appliances, machinery, etc.). Such services may have different and independent air interfaces and channel numerologies that may have, for example, different coding/modulation, separate synchronization channels, different master information blocks (MIBs), different system information blocks (SIBs), etc. In some cases, a UE 115 or base station 105 may identify different services based on the air interface associated with the particular service. As indicated above, in some examples channel numerologies for all or a portion of certain downlink transmissions may be selected based on whether the downlink transmission includes a synchronization signal transmission, physical broadcast channel (PBCH) transmissions, or any combination thereof.

In the example of FIG. 1, base station 105-a may include a RACH procedure manager 120, which may configure a RACH procedure to include multiple PRACH transmissions. For example, the RACH procedure manager 120 may combine PRACH transmissions into a combined PRACH control message. The RACH procedure manager 120 may be an example of the base station RACH manager 1215 as described with reference to FIG. 12.

UEs 115 may include a RACH procedure manager 140, which may configure a RACH procedure to include multiple PRACH transmissions. For example, the UE RACH procedure manager 140 may cause subsequent retransmissions of a PRACH transmission to be transmitted at a higher power level. In other examples, the UE RACH procedure manager 140 may link PRACH transmissions together such that they are re-combinable. The UE RACH procedure manager 140 may be an example of the UE RACH manager 1615 as described with reference to FIG. 16.

Figure 2:
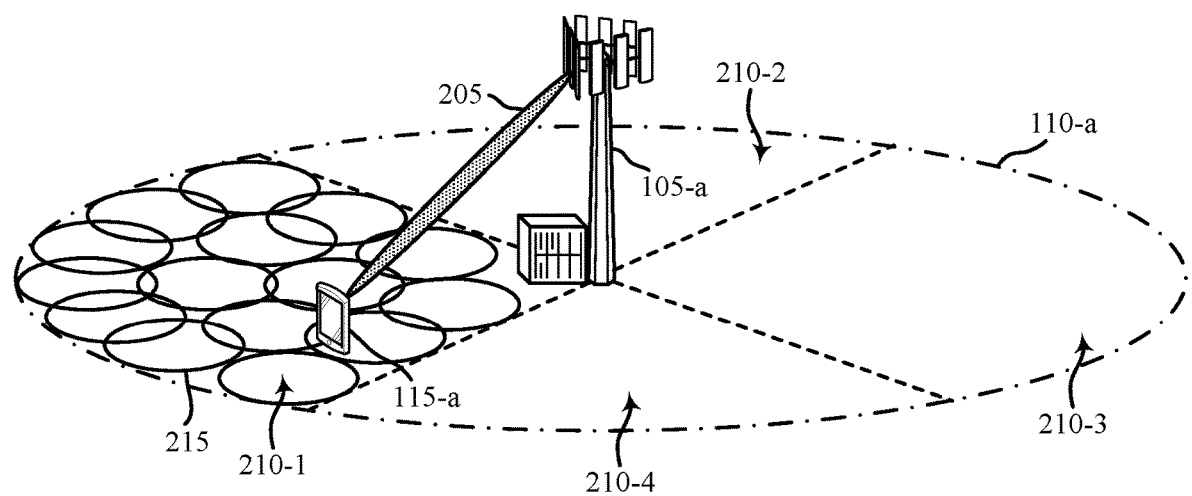
FIG. 2 illustrates an example of a wireless communications system that supports RACH procedures using multiple PRACH transmissions in accordance with one or more aspects of the present disclosure.

FIG. 2 illustrates an example of a wireless communications system 200 for RACH procedures using multiple PRACH transmissions in accordance with one or more aspects of the present disclosure. The wireless communications system 200 may be an example of the wireless communications system 100 discussed with reference to FIG. 1. The wireless communications system 200 may include a base station 105-a and a UE 115-a. A coverage area 110-a may be defined for the base station 105-a. While only a single base station 105-a and a single UE 115-a are depicted, the wireless communications system 200 may include additional base stations 105 and additional UEs 115. The base station 105-a may be an example of the base stations 105 described with reference to FIG. 1. The UE 115-a be an example of the UEs 115 described with reference to FIG. 1. The base station 105-a may be an example of a target base station 105 in a RACH procedure.

In some examples, the base station 105-a may communicate with the UE 115-a via directional communication links 205 (sometimes referred to as directional wireless beams or directional beams). The base station 105-a may generate any number of directional communication links 205. The directional communication link 205 may be pointed in a specific direction and provide high-bandwidth links between the base station 105-a and the UE 115-a. Signal processing techniques, such as beamforming, may be used to coherently combine energy to form the directional communication link 205. Wireless communication links achieved through beamforming may be associated with narrow beams (e.g., "pencil beams") that are highly directional, minimize inter-link interference, and provide high-bandwidth links between wireless nodes (e.g., base stations, access nodes, UEs). In some examples, the directional communication links 205 may be referred to as total radiated powers (TRPs).

In some examples, the base station 105-a may operate in millimeter wave (mmW) frequency ranges, e.g., 28 GHz, 40 GHz, 60 GHz. In some examples, the directional communication links 205 are transmitted using frequencies greater than 6 GHz. Wireless communication at these frequencies may be associated with increased signal attenuation, e.g., path loss, which may be influenced by various factors, such as temperature, barometric pressure, diffraction. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may only be directed to one wireless device at a time due to the directionality of the transmitted signal.

Each directional communication link 205 may have beam characteristics such as a width and a direction (e.g., an absolute direction based on a coordinate system such as compass directions or a relative direction) where the directional communication link 205 is pointed. The width for each directional communication link 205 may be different. The width may be related to the size of the phased array antenna used to generate the directional communication link 205. Different widths may be used by the base station 105-a in different scenarios.

The directional communication links 205 generated by the base station 105-a may be pointed at any geographic location. The direction may refer to a target of the directional communication link 205. The direction of the directional transmission may be a location of a UE 115-a. The direction may be any location in a three-dimensional space. For example, the direction may include a pitch parameter indicative of a vertical pitch of the directional communication link 205 and a position vector indicative of a direction that the directional communication link 205 is pointing (e.g., a direction on a compass).

Because directional communication links 205 may serve a limited geographic area, as a UE 115-a moves through a coverage area 110-a it may lose its signal or need to frequently be handed-off to other directional communication links 205. To facilitate UE mobility, the coverage area 110-a may be divided into zones 210 and cells 215. A coverage area 110-a may include any number of zones 210. A zone may include any number of cells 215. A zone 210 may refer to a collection of synchronized cells. A cell 215 may refer to a collection of synchronized TRPs (e.g., directional communication links 205). To facilitate UE mobility in the coverage area, different cells in a zone may use similar communication protocols to ease the transition between different cells. For example, the communication protocols used by the cells 215 found in zone 210-1 may include similar features to facilitate handovers of the UE 115-a between different cells 215 in the zone 210-1. In addition, communication protocols used by TRPs in a particular cell 215 may also include similar features to facilitate handovers of a UE 115-a between different TRPs in the cell 215. As part of UE mobility, various measurements and messages may be exchanged between the base station 105-a and the UE 115-a.

Figure 3:
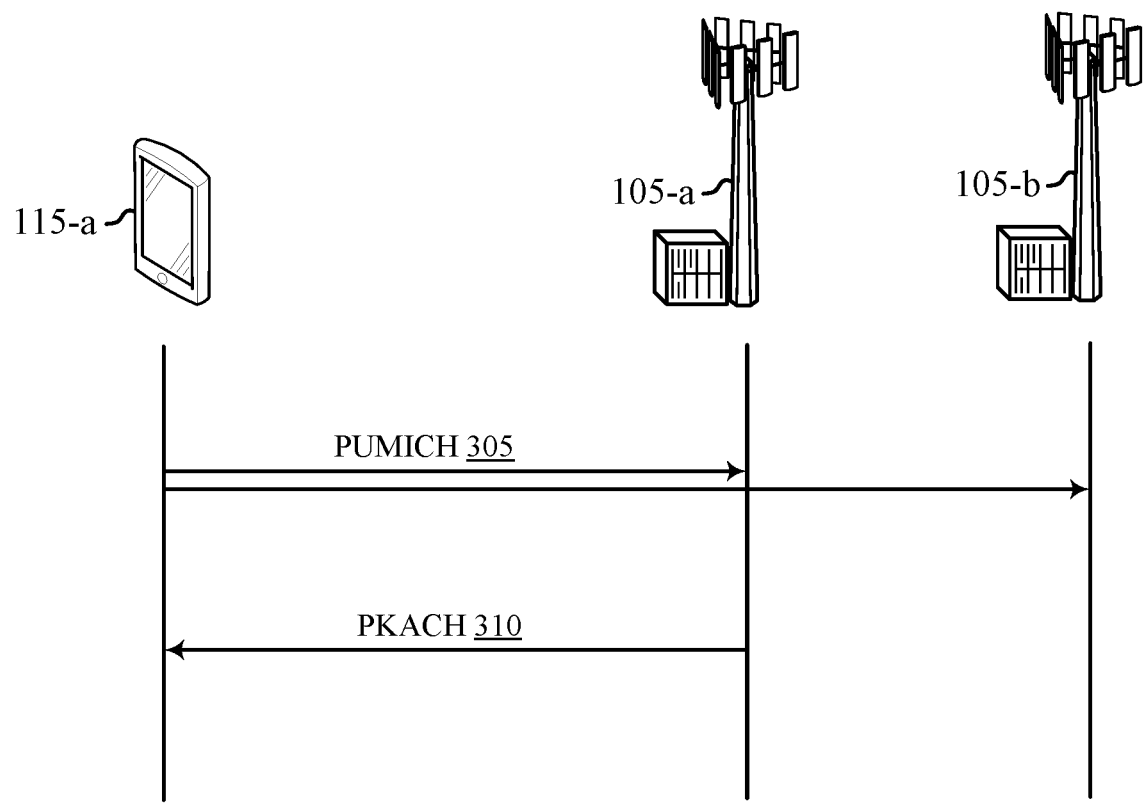
FIG. 3 illustrates an example of a communication scheme that supports RACH procedures using multiple PRACH transmissions in accordance with one or more aspects of the present disclosure.

FIG. 3 illustrates an example of a communication scheme 300 for RACH procedures using multiple PRACH transmissions in accordance with one or more aspects of the present disclosure. The communication scheme 300 may support UE mobility procedures. The communication scheme 300 includes communications between the UE 115-a and one or more base stations (e.g., base stations 105-a, 105-b). In some examples, the UE 115-a may communicate with zones 210 of a base station 105, cells 215 of a base station 105, TRPs of a base station 105, or combinations thereof.

UE mobility procedures may be UL based mobility procedures. In such situations, the UE 115-a may transmit a reference signal to the base station 105-a and the base station 105-a may perform a number of measurements and/or operations based on the reference signal. Advantages of UL based mobility procedures over DL based mobility procedures may include: reduced power consumption by the UE 115-a, reduced paging error rates, reduced latency is call set-up, reduced network resource utilization (e.g., network may not transmit a reference signal or do paging), reduced handover failure rate, other advantages, or combinations thereof. Other advantages of UL based mobility procedures over DL based mobility procedures may include: more flexible power consumption to reliability tradeoff for the UE 115-a, faster L1 handshake to provide both the UE 115-a and the base station 105-a (e.g., the network generally) with better more timely information on channel conditions, better mobility tracking (e.g., location tracking) when more antennas are available at the base station 105-a, or combinations thereof.

As part of UL based mobility procedures, the UE 115-a may broadcast a physical uplink measurement indication channel (PUMICH) message 305. The PUMICH message 305 may be received by any number of base stations 105. The PUMICH message 305 may be an example of a reference signal transmitted by a UE 115 in a UL based mobility. In response, the base station 105-a may transmit a physical keep-alive channel (PKACH) message 310 to the UE 115-a. The PKACH message 310 may be configured to acknowledge the UL mobility reference signal (e.g., PUMICH message 305) and signaling the paging indicator. In some examples, the PKACH message 310 may include one bit of information for acknowledging the PUMICH message 305 and the paging indication.

Figure 4:
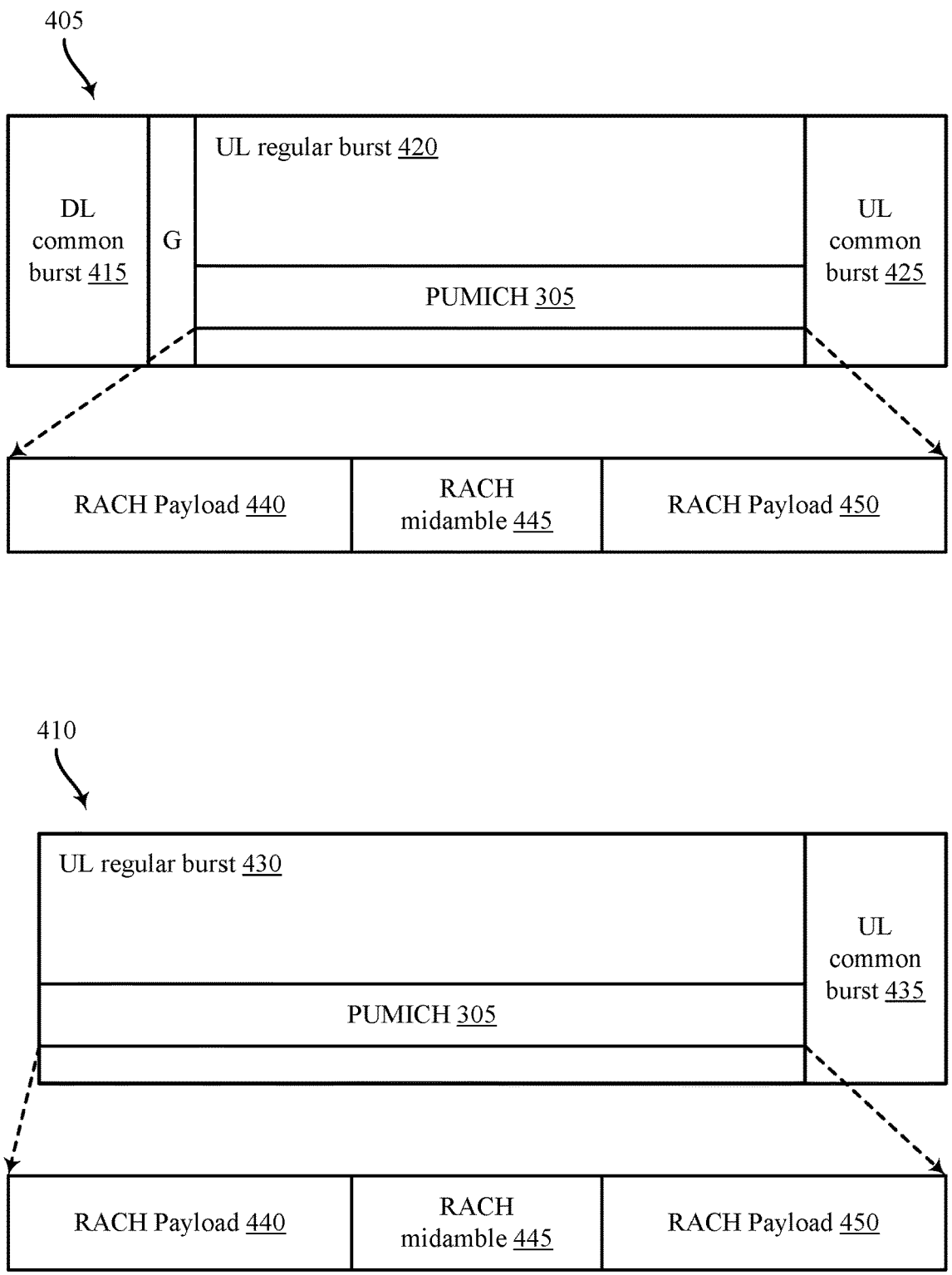
FIG. 4 illustrates an example of a resource structure that supports RACH procedures using multiple PRACH transmissions in accordance with one or more aspects of the present disclosure.

FIG. 4 illustrates an example of a resource structure 400 for RACH procedures using multiple PRACH transmissions in accordance with one or more aspects of the present disclosure. The resource structures 400 may support UE mobility procedures. The resource structures 400 may include a time division duplexed (TDD) self-contained uplink-centric slot 405 and/or a frequency division duplexed (FDD) self-contained uplink-centric slot 410. The PUMICH message 305 may be mapped to the TDD slot 405 or the FDD slot 410.

The TDD slot 405 may include a DL common burst 415, a UL regular burst 420, and a UL common burst 425. A burst may refer to a relatively high-bandwidth transmission over a short period. For example, a communication protocol may transmit at 2 Mbit/s on average, while having "bursts" that may transmit at 2.4 Mbit/s. A burst may refer to a relatively high data signal rate compared to average data signal rates rate in a short transmission interval. In some examples, a burst may include compressing the data before transmission. In some examples, the PUMICH message 305 may be mapped to the UL regular burst 420 of the TDD slot 405. In some examples, the DL common burst 415 is not part of the TDD slot 405, but rather merely precedes the TDD slot 405. In some examples, the UL common burst 425 may be configured to include control information associated with the wireless communications system 200.

The FDD slot 410 may include a UL regular burst 430 and a UL common burst 435. The UL regular burst 430 may be an example of the UL regular burst 420 described herein. The UL common burst 435 may be an example of the UL common burst 425 described herein. In some examples, the PUMICH message 305 may be mapped to the UL regular burst 420 of the FDD slot 410.

The PUMICH message 305 may include first RACH payload 440, a RACH midamble 445, and a second RACH payload 450. The first RACH payload 440 may be transmitted prior to transmitting the RACH midamble 445. The RACH midamble 445 may be referred to as a control portion of the PUMICH message 305. The RACH payloads 440, 450 may include an identification of the transmitting UE 115. The first RACH payload 440 may not be decoded until after the RACH midamble 445 is received and decoded. In other instances, the PUMICH message 305 may include a preamble and a single RACH payload transmitted after the preamble. The RACH midamble 445 may be used for (1) random access and (2) demodulation of the reference signal for PRACH payload demodulation. In some examples, the term RACH payload and the term RACH message may be used interchangeably.

Figure 5:
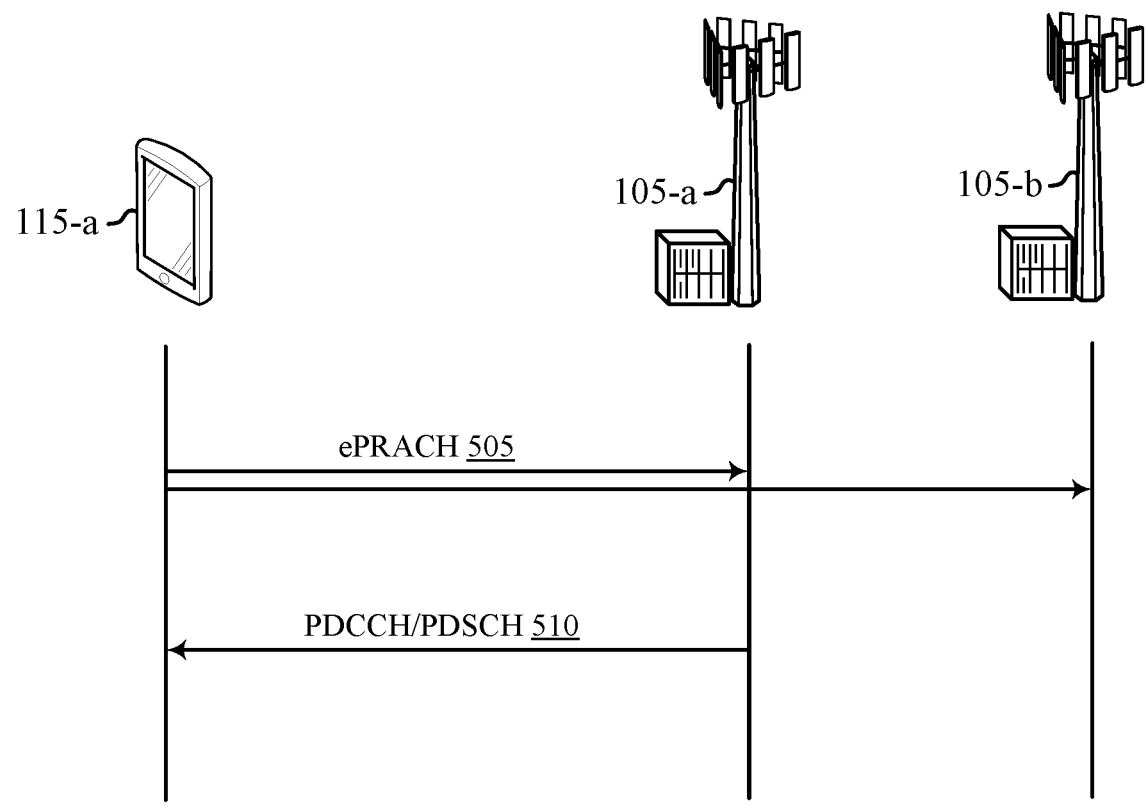
FIG. 5 illustrates an example of a communication scheme that supports RACH procedures using multiple PRACH transmissions in accordance with one or more aspects of the present disclosure.

FIG. 5 illustrates an example of a communication scheme 500 for RACH procedures using multiple PRACH transmissions in accordance with one or more aspects of the present disclosure. The communication scheme 500 may support UE mobility procedures. The communication scheme 500 includes communications between the UE 115-a and one or more base stations (e.g., base stations 105-a, 105-b). In some examples, the UE 115-a may communicate with zones 210 of a base station 105, cells 215 of a base station 105, TRPs of a base station 105, or combinations thereof.

The communication scheme 500 may represent a two-step RACH procedure. The UE 115-a may broadcast a ePhysical Random Access Channel (ePRACH) message 505. The ePRACH message 505 may be received by any number of base stations 105. The ePRACH message 505 may be an example of a reference signal transmitted by a UE 115 in a UL based mobility. In response, the base station 105-a may transmit a physical downlink control channel (PDCCH)/physical downlink shared channel (PDSCH) message 510 to the UE 115-a. The PDCCH/PDSCH message 510 may be configured to acknowledge the UL mobility reference signal (e.g., ePRACH message 505) and signaling the paging indicator. In some examples, the ePRACH message 505 may be referred to as eMSG1 and the PDCCH/PDSCH message 510 may be referred to as eMSG2. The PDCCH/PDSCH message 510 may include a detected RACH midamble identification, a backoff indicator, a contention resolution message, a timing advance (TA), a transmit power control (TPC), other information, or any combination thereof.

Figure 6:
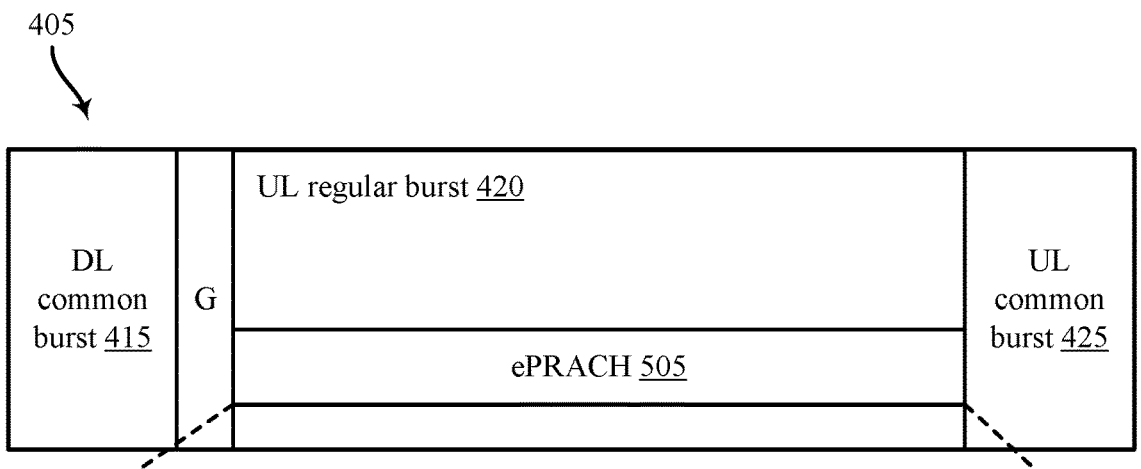
FIG. 6 illustrates an example of a resource structure that supports RACH procedures using multiple PRACH transmissions in accordance with one or more aspects of the present disclosure.
Figure 6:
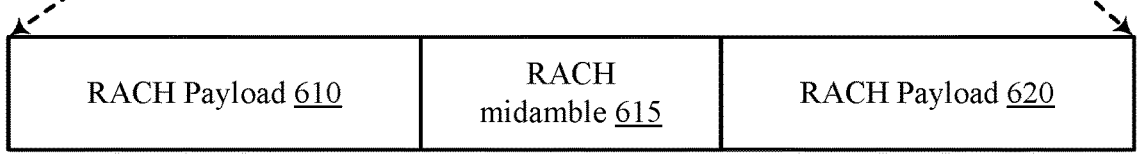
Figure 6:
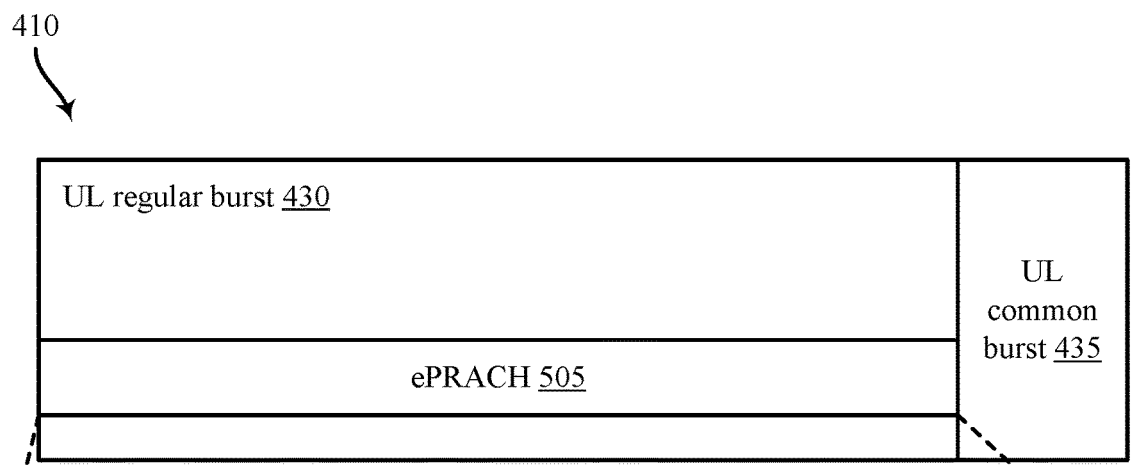
Figure 6:
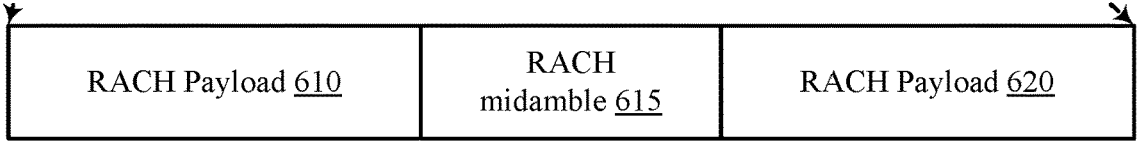

FIG. 6 illustrates an example of a resource structure 600 for RACH procedures using multiple PRACH transmissions in accordance with one or more aspects of the present disclosure. The resource structures 600 may support UE mobility procedures. The resource structures 600 may include the TDD slot 405 and/or the FDD slot 410. The ePRACH message 505 may be mapped to the TDD slot 405 or the FDD slot 410. The TDD slot 405 may be an example of the TDD slot 405 described with reference to FIG. 4. The FDD slot 410 may be an example of the FDD slot 410 described with reference to FIG. 4.

The ePRACH message 505 may include first RACH payload 610, a RACH midamble 615, and a second RACH payload 620. The RACH midamble 615 may be an example of the RACH midamble 445 described with reference to FIG. 4 and may include similar features.

The RACH payloads 610, 620 may include an identification of the UE 115 that transmits the ePRACH message 505 and a buffer state report (BSR) indicative of how much data the UE 115-a has waiting to be transmitted to the base station 105-a. The RACH midamble 615 may be configured for random access and demodulating the reference signal for demodulation of the RACH payloads 610, 620.

Figure 7:
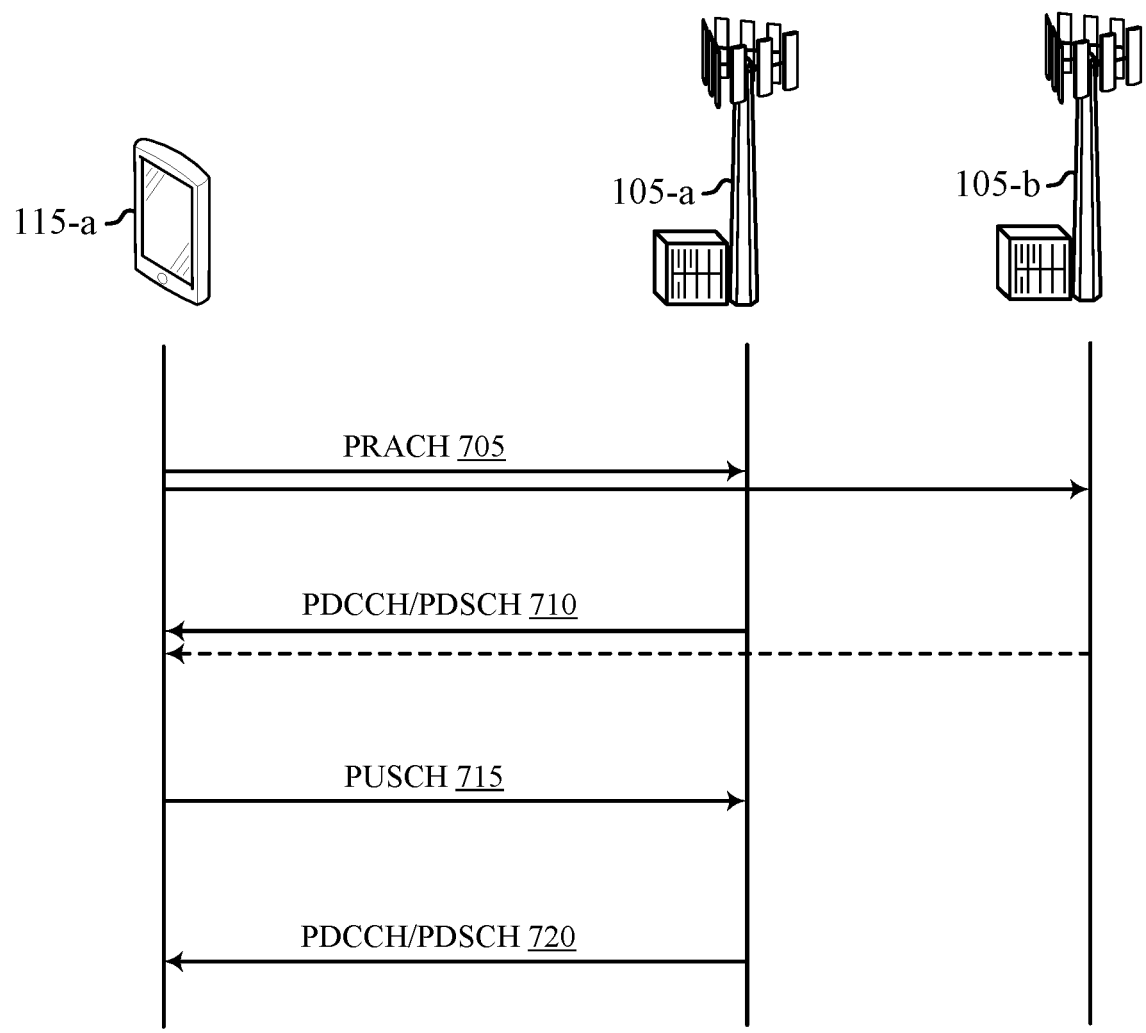
FIG. 7 illustrates an example of a communication scheme that supports RACH procedures using multiple PRACH transmissions in accordance with one or more aspects of the present disclosure.

FIG. 7 illustrates an example of a communication scheme 700 for RACH procedures using multiple PRACH transmissions in accordance with one or more aspects of the present disclosure. The communication scheme 700 may support UE mobility procedures. The communication scheme 700 includes communications between the UE 115-a and one or more base stations (e.g., base stations 105-a, 105-b). In some examples, the UE 115-a may communicate with zones 210 of a base station 105, cells 215 of a base station 105, TRPs of a base station 105, or combinations thereof.

The communication scheme 700 may represent a four-step RACH procedure. The UE 115-a may broadcast a PRACH message 705. The PRACH message 705 may be received by any number of base stations 105. The PRACH message 705 may be an example of a reference signal transmitted by a UE 115 in a UL based mobility. In response, the base station 105-a may transmit a first PDCCH/PDSCH message 710 to the UE 115-a. The first PDCCH/PDSCH message 710 may be configured to acknowledge the UL mobility reference signal (e.g., PRACH message 705) and signaling the paging indicator. The first PDCCH/PDSCH message 710 may include a detected RACH preamble identification, a backoff indicator, a TA, a UL grant, a cell radio network temporary identifier (C-RNTI), other information, or any combination thereof.

The UE 115-a may transmit a physical uplink shared channel (PUSCH) message 715 in response to receiving the first PDCCH/PDSCH message 710. The PUSCH message 715 may include a radio resource control (RRC) connection request, tracking area update, a scheduling request, other information, or combinations thereof. In response, the base station 105-a may transmit a second PDCCH/PDSCH message 720. The second PDCCH/PDSCH message 720 may include a contention resolution message or other information. In some examples, the PRACH message 705 may be referred to as MSG1, the first PDCCH/PDSCH message 710 may be referred to as MSG2, the PUSCH message 715 may be referred to as MSG3, and the second PDCCH/PDSCH message 720 may be referred to as MSG4.

Figure 8:
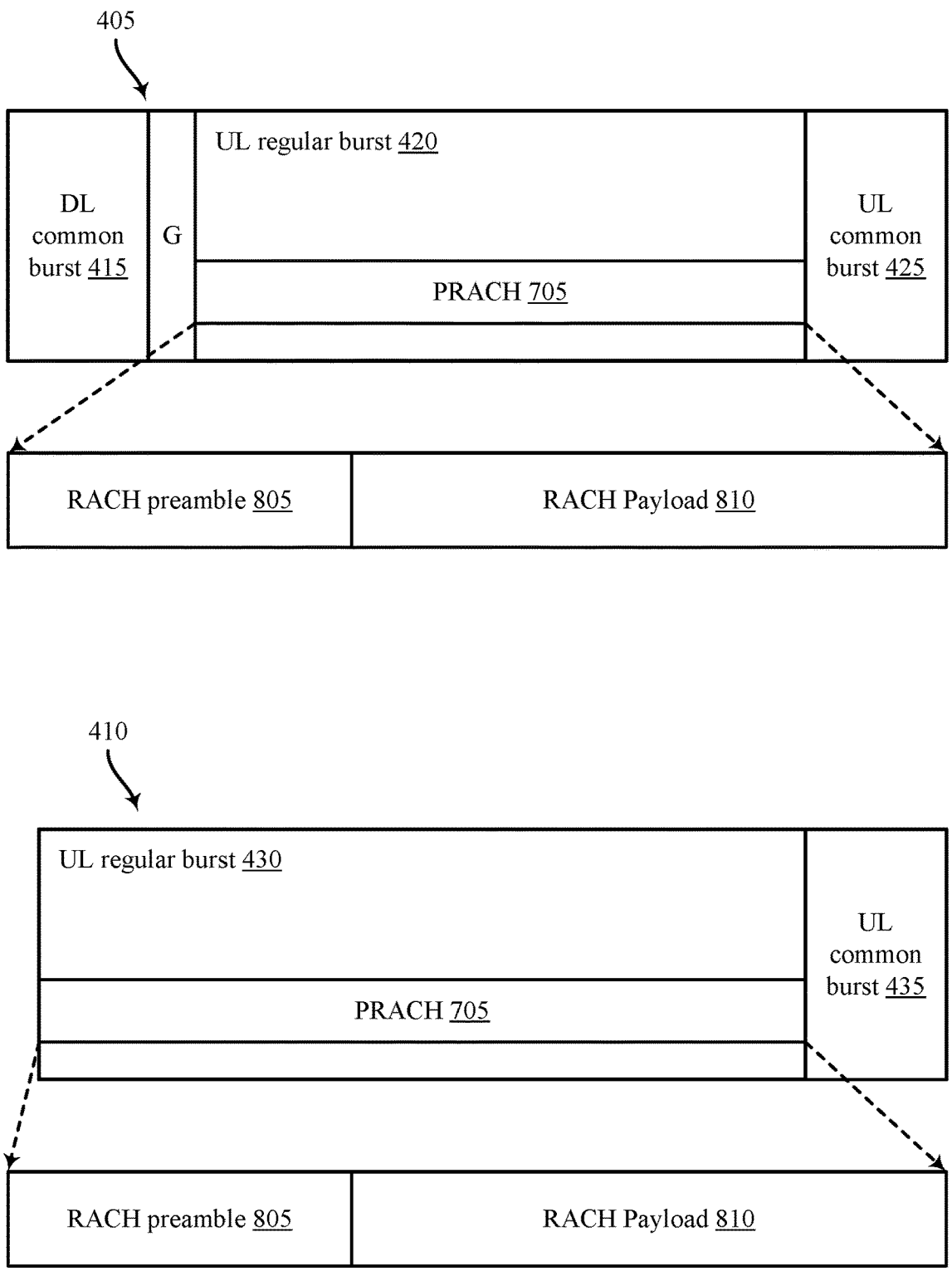
FIG. 8 illustrates an example of a resource structure that supports RACH procedures using multiple PRACH transmissions in accordance with one or more aspects of the present disclosure.

FIG. 8 illustrates an example of a resource structure 800 for RACH procedures using multiple PRACH transmissions in accordance with one or more aspects of the present disclosure. The resource structures 800 may support UE mobility procedures. The resource structures 800 may include the TDD slot 405 and/or the FDD slot 410. The PRACH message 705 may be mapped to the TDD slot 405 or the FDD slot 410. The TDD slot 405 may be an example of the TDD slot 405 described with reference to FIG. 4. The FDD slot 410 may be an example of the FDD slot 410 described with reference to FIG. 4.

The PRACH message 705 may include a RACH preamble 805 and RACH payload 810. The RACH preamble 805 may include control information related to the PRACH message 705. In some examples, the RACH preamble 805 may be used to demodulate the RACH payload 810. The RACH preamble 805 may be an example of the RACH midambles 445, 615 described with reference to FIGS. 4 and 6 and may include similar features. The RACH payload 810 may include an identification of the UE 115 that transmits the PRACH message 705 and/or a BSR indicative of how much data the UE 115-a has waiting to be transmitted to the base station 105-a.

Figure 9:
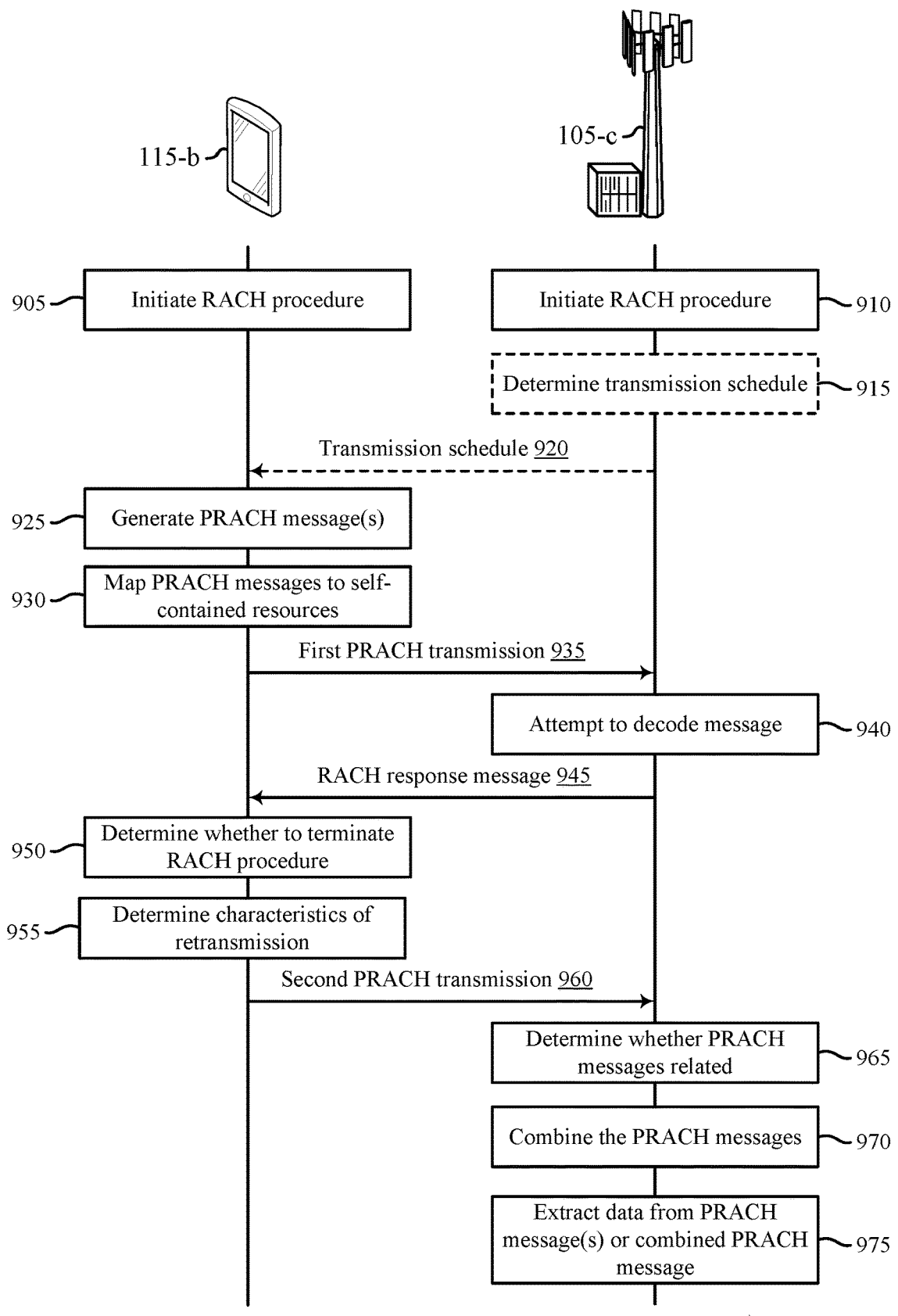
FIG. 9 illustrates an example of a communication scheme that supports RACH procedures using multiple PRACH transmissions in accordance with one or more aspects of the present disclosure.

FIG. 9 illustrates an example of a communication scheme 900 for RACH procedures using multiple PRACH transmissions in accordance with one or more aspects of the present disclosure. In some examples, PRACH transmissions may be referred to as PRACH messages. The communication scheme 900 includes communications between a UE 115-b and a target base station 105-c of a RACH procedure. The communication scheme 900 may be used in conjunction with any of the UE mobility procedures described with reference to FIGS. 3-8. The communication scheme 900 may be configured to improve a link budget of PRACH transmissions based at least in part on combining multiple PRACH transmissions associated with a single RACH procedure. In some examples, the base station 105-c may generate a combined PRACH control message based at least in part on the at least two PRACH transmissions being identical and a fixed timing existing between the transmissions of the at least two PRACH transmissions. Such a communication scheme 900 may improve the link budget for low geometry UEs or cell-edge UEs. The UE 115-b may be an example of the UEs 115 described with reference to FIGS. 1-8. The base station 105-c may be an example of the base stations 105 described with reference to FIGS. 1-8.

At block 905, the UE 115-b may initiate a RACH procedure. As a UE 115-b moves through a coverage area of a base station 105-c, the signal associated with a communication link between the UE 115-b and the base station 105-c may fade or be terminated. Such conditions may be more pronounced in a wireless communications system that uses directional communication links (e.g., wireless communications system 200) because each communication link may serve a limited geographic area. To establish a communication link with a new base station 105, zone 210, cell 215, directional communication link 205, or combinations thereof, the UE-b may initiate a RACH procedure. The RACH procedure may be a contention-free RACH procedure used as part of a handover procedure. In some examples, the RACH procedure may be a contention based RACH procedure. In some examples, at block 910, the determination that a RACH procedure should be initiated is done by the base station 105-c rather than UE 115-b.

At block 915, the base station 105-c may determine a transmission schedule for the RACH procedure. For example, in some contention-free RACH procedures, multiple PRACH transmissions may be used. If it is determined that multiple PRACH transmissions should be used, the base station 105-c may determine a PRACH transmission schedule 920 having a plurality of PRACH transmission opportunities. The PRACH transmission schedule 920 may include data indicative of transmission times for each PRACH transmission, the maximum number of PRACH transmissions or PRACH transmission opportunities, the communication resources that may be used by each PRACH transmission, or combinations thereof. For example, the PRACH transmission schedule 920 may specify which slots may be used to transmit a PRACH transmission, which frequency sub-bands may be used to transmit a PRACH transmission, or other information about the what communication resources are assigned for the RACH procedure. The base station 105-c may transmit the PRACH transmission schedule 920 to the UE 115-b based at least in part on the determinations discussed above.

At block 925, the UE 115-b may generate one or more PRACH transmissions based at least in part on a RACH procedure being initiated. In some examples, the PRACH transmissions may be generated based at least in part on the PRACH transmission schedule 920 received from the base station 105-c. The PRACH transmissions may be an example of messages 305, 505, 705 described with reference to FIGS. 3-8. The PRACH transmissions may include a control portion (e.g., a midamble or a preamble) and a data portion (e.g., a payload). The PRACH transmission may be either a type I PRACH transmission or a type II PRACH transmission.

The PRACH transmissions may be generated based at least in part on the which communication resources may be used to communicate the PRACH transmission. For example, multiple time-separate slots may be used to transmit the multiple PRACH transmissions or multiple frequency sub-bands may be used to transmit the multiple PRACH transmissions. The communication resources associated with each PRACH transmission may define what time-based communication resources (e.g., slots) or what frequency-based communication resources (e.g., sub-bands) may be used to transmit the PRACH transmission. The UE 115-b may generate any number of PRACH transmissions. In some examples, the number of PRACH transmissions generated is based at least in part on what type of RACH procedure is being performed (e.g., contention-free or contention-based). In some examples, the number of PRACH transmission generated is based at least in part on a predetermined value of transmission attempts. In some examples, the number of PRACH transmissions generated is based at least in part on the PRACH transmission schedule 920.

In some examples, multiple PRACH transmissions may be generated all at once. In other examples, only a single PRACH transmission may be generated and additional PRACH transmissions may be generated based on some feedback mechanisms. For example, if a PRACH transmission was not successfully decoded, an indication message may request that the another PRACH transmission be sent or that the previous PRACH transmission be retransmitted.

At block 930, the UE 115-b may map the PRACH transmission to self-contained communication resources. For example, the UE 115-b may map a PRACH transmission to the TDD slot 405 or the FDD slot 410 described with reference to FIGS. 4, 6, and 8. In some examples, PRACH transmissions may be categorized into two PRACH channel types: a first type and a second type. The first type may include PRACH transmissions having a RACH preamble and RACH payload (e.g., PRACH transmission 705 described with reference to FIGS. 7-8). The second type may include PRACH transmissions having a first RACH payload, a RACH midamble, and a second RACH payload (e.g., messages 305, 505 described with reference to FIGS. 3-6). PRACH transmissions associated with UL based mobility, a two-step RACH procedure, or a four-step RACH procedure may be mapped to the slots 405, 410. Such a mapping may include mapping the content of the PRACH transmission to characteristics dictated by the UL regular bursts 420 or 430.

The UE 115-b may transmit a first PRACH transmission 935 to the base station 105-c at a first time via first set of communication resources. The first PRACH transmission 935 may be the only PRACH transmission transmitted, if the transmission is successfully decoded at the receiving end.

At block 940, the base station 105-c may attempt to decode the first PRACH transmission 935. The base station 105-c may generate and transmit a RACH response message 945 regardless of whether the decoding was successful. In some examples, the RACH response message 945 may be referred to as an indication message. The RACH response message 945 may be an example of an acknowledgement (ACK)/negative acknowledgement (NACK) message. For example, if the first PRACH transmission 935 is not successfully decoded, the RACH response message 945 may include a NACK. Such a NACK may indicate that a retransmission of a PRACH transmission is requested. In other examples, if the first PRACH transmission 935 is successfully decoded, the RACH response message 945 may include an ACK that the PRACH transmission was successfully received and transmitted. Such an ACK may indicate an early termination of the RACH procedure. In some examples, an ACK may be a single bit of information. In some examples, the base station 105-*c* may not be able to decode the RACH payload. Because the UE-ID is included in the payload portion, the base station 105-*c* may not be able to transmit a RACH response message 945 to the UE 115-*b*. In some examples, the base station 105-*c* may not be able to decode both the control portion and the payload portion of the PRACH transmission. In some examples, the base station 105-*c* may be able to decode the control portion but not the payload portion of the PRACH transmission.

At block 950, the UE 115-*b* may determine whether to terminate the RACH procedure. The RACH procedure may be terminated because the first RACH message was successfully decoded. The RACH procedure may be terminated based at least in part on receiving an ACK in the RACH response message 945. The RACH procedure may be terminated based at least in part on the RACH response message 945 including instructions from the base station 105-*c* to cease transmitting PRACH transmissions. In some examples, determining whether to terminate a RACH procedure may include identifying a number of received PRACH transmissions as part of a single RACH procedure and comparing that number to a predetermined threshold number of PRACH transmissions. The base station 105-*c* may terminate the RACH procedure based at least in part on the number of received PRACH transmissions satisfying (e.g., is greater than or equal to) the predetermined threshold number of PRACH transmissions. In some examples, the UE 115-*b* may wait for a predetermined amount of time for a RACH response message 945. If the RACH response message 945 is not received within the predetermined time, the UE 115-*b* may determine that the base station 105-*c* was not able to decode the first PRACH transmission 935 successfully. In this manner, generating and transmitting a subsequent PRACH transmission (e.g., the second PRACH transmission 960) may be based at least in part on not receiving a RACH response 945 in a specified time frame.

At block 955, the UE 115-*b* may determine characteristics of a second PRACH transmission 960 or, in some cases, a retransmission of the first PRACH transmission 935. The second PRACH transmission 960, in some examples, may be identical to the first PRACH transmission 935 such that the transmission of the second PRACH transmission 960 may be considered a retransmission of the first PRACH transmission 935. The second PRACH transmission (or retransmission as may be the case) may be at a second time via a second set of communication resources. The first PRACH transmission 935 and the second PRACH transmission 960 may be examples of the messages 305, 505, 705 described with reference to FIGS. 3-8. In some examples, the PRACH transmissions may be either type I messages or type II messages. In some examples, additional PRACH transmissions may transmitted beyond the two shown and described here. For example, any number of PRACH transmissions may be transmitted as part of a RACH procedure. In some examples, the PRACH transmissions transmitted by the UE 115-*b* may include identical payloads and identical preamble or midambles.

The UE 115-*b* may determine characteristics of the second PRACH transmission 960 such as a power level of the second PRACH transmission 960, a transmission time of the second PRACH transmission 960 based at least in part on the transmission of the first PRACH transmission 935 and a fixed timing, whether to include multiple PRACH transmission in the same slot, the frequency sub-band of the second PRACH transmission 960, or combinations thereof. The UE 115-*b* may determine a fixed timing between the transmissions of the PRACH transmissions. For example, the fixed timing may dictate that after so many units of time (e.g., seconds, slots, or other measurements), a UE 115-*b* may be configured to transmit another PRACH transmission as part of the RACH procedure. The fixed timing may be based at least in part on a predetermined timeframe. A fixed timing may be used as a signal to the base station 105-*c* that multiple PRACH transmissions are related to each other and to a single RACH procedure. In some examples, the UE 115-*b* may determine a fixed frequency offset instead of a fixed timing. Such a fixed frequency offset may include similar features as the fixed timing, but it involves the frequency-domain instead of the time-domain.

In some examples, the PRACH transmissions may be generated based at least in part on an outer loop power control. In such examples, if the current PRACH transmission fails to be decoded, the UE 115-*b* may retransmit the PRACH transmission at a higher power level than the current PRACH transmission. In this manner, the power levels of subsequent PRACH transmission may be stepped-up to improve the link budget of the PRACH transmission.

In some examples, the UE 115-*b* may link multiple PRACH transmissions together based at least in part on initiating a PRACH procedure that includes multiple PRACH transmissions. In some examples, the linking of the PRACH transmissions together may include the use of fixed timings or fixed frequency offsets. In some examples, the PRACH transmissions may be linked based at least in part on data included in the PRACH transmissions. For example, data may be included in the payload portion of the control portion indicating that the particular PRACH transmission is related to other PRACH transmissions.

At blocks 965-975, the base station 105-*c* may perform a number of operations to improve the link budget of a PRACH transmission. In some examples, the base station 105-*c* may combine multiple PRACH transmissions (e.g., the first PRACH transmission 935 and the second PRACH transmission 960) to improve the link budget. Combining the PRACH transmission may be based at least in part on a number of conditions being met.

At block 965, the base station 105-*c* may determine whether PRACH message are related to the same RACH procedure and/or to the UE (e.g., UE 115-*b*). To do this the base station 105-*c* may identify common portions present in both PRACH transmissions 935 and 960 prior to combining PRACH transmissions. In some examples, if the PRACH transmissions do not have identical content (e.g., both the payloads and the preamble/midamble are not identical), the base station 105-*c* may not combine the PRACH transmissions. In some examples, the base station 105-*c* may determine whether the first PRACH transmission 935 is the same as the second PRACH transmission 960. In some examples, the base station 105-*c* may determine that a type of the first PRACH transmission 935 is the same as a type of the second PRACH transmission 960. The base station 105-*c* may determine that both PRACH transmissions 935 and 960 are either a type one PRACH transmission or a type two PRACH transmission. If the types of the PRACH transmissions do not match, the base station 105-*c* may not combine the PRACH transmissions. In some examples, the base station 105-*c* may identify a location of a first control portion (e.g., the midamble or the preamble) in the first PRACH transmission 935 and may identify a location of the second control portion (e.g., the midamble or the preamble) in the second PRACH transmission 960.

The base station 105-c also may determine whether a difference between the reception time of the first PRACH transmission 935 and a reception time of the second PRACH transmission 960 is similar to a fixed timing prior to combining the PRACH transmissions into a combined PRACH control message. The fixed timing may be a predetermined timeframe in a RACH procedure. If the difference is equal to or similar to the fixed timing, the base station 105-c may determine that that the first and second PRACH transmissions are related. In some examples, the base station 105-c may determine a frequency offset between the PRACH transmissions 935, 960 instead of a fixed timing. The frequency offset may be compared to a fixed frequency offset to determine whether the PRACH transmissions are related.

At block 970, the base station 105-c may combine multiple PRACH transmissions together to form a combined PRACH control message. Combining the PRACH transmissions together may be based at least in part on the PRACH transmissions being the same and the differences in reception times of the PRACH transmissions being equal to the fixed timing. In some examples, combining the PRACH transmissions together may be based at least in part on the first PRACH transmission, the second PRACH transmission, the common portion, and the fixed timing. The combined PRACH control message may be configured to have an improved link budget over at least one PRACH transmission used in the RACH procedure. In some examples, the combined PRACH control message may be configured to have an improved link budget over all of the PRACH transmission used in the RACH procedure. The combined PRACH control message may include the same payload portions and the same control portions as the multiple PRACH transmissions used to generate the combined PRACH control message.

At block 975, the base station 105-c may extract data from the combined PRACH control message. Extracting the data may include decoding the data in the combined PRACH control message. In some examples, the base station 105-c may extract the data common to all of the PRACH transmissions used to generate the combined PRACH control message. The data may be extracted based at least in part on the common portion and the fixed timing. In some examples, the data may be extracted based at least in part on a common portion and a fixed frequency offset. In some examples, the data may be extracted based at least in part on the common portion, the fixed timing, the fixed frequency offset, a contention-free RACH procedure being initiated, determining that the multiple PRACH transmissions are the same type, the combined PRACH control message, the locations of the control portions in the multiple PRACH transmissions, the number of the number of received PRACH transmissions being equal to or greater than a predetermined threshold number of PRACH transmissions, the PRACH transmission schedule 920, the UE 115-b being in a radio resource control (RRC) active state, or combinations thereof.

In some examples, the base station 105-c may extract the data based at least in part on a single PRACH transmission (e.g., the first PRACH transmission 935 or the second PRACH transmission 960). For example, if subsequent PRACH transmissions include higher power levels, eventually the base station 105-c may decode the PRACH transmission based on one of the PRACH transmission with a higher power level.

While only two PRACH transmissions are shown and described in communication scheme 900, the communication scheme 900 may include additional PRACH messages. For example, if the data is not successfully extracted at block 975, the communication scheme 900 may return to blocks 940/950 to transmit an indication message and determine characteristics of an additional PRACH transmission. Such a process loop may be iterated as many times as necessary.

Figure 10:
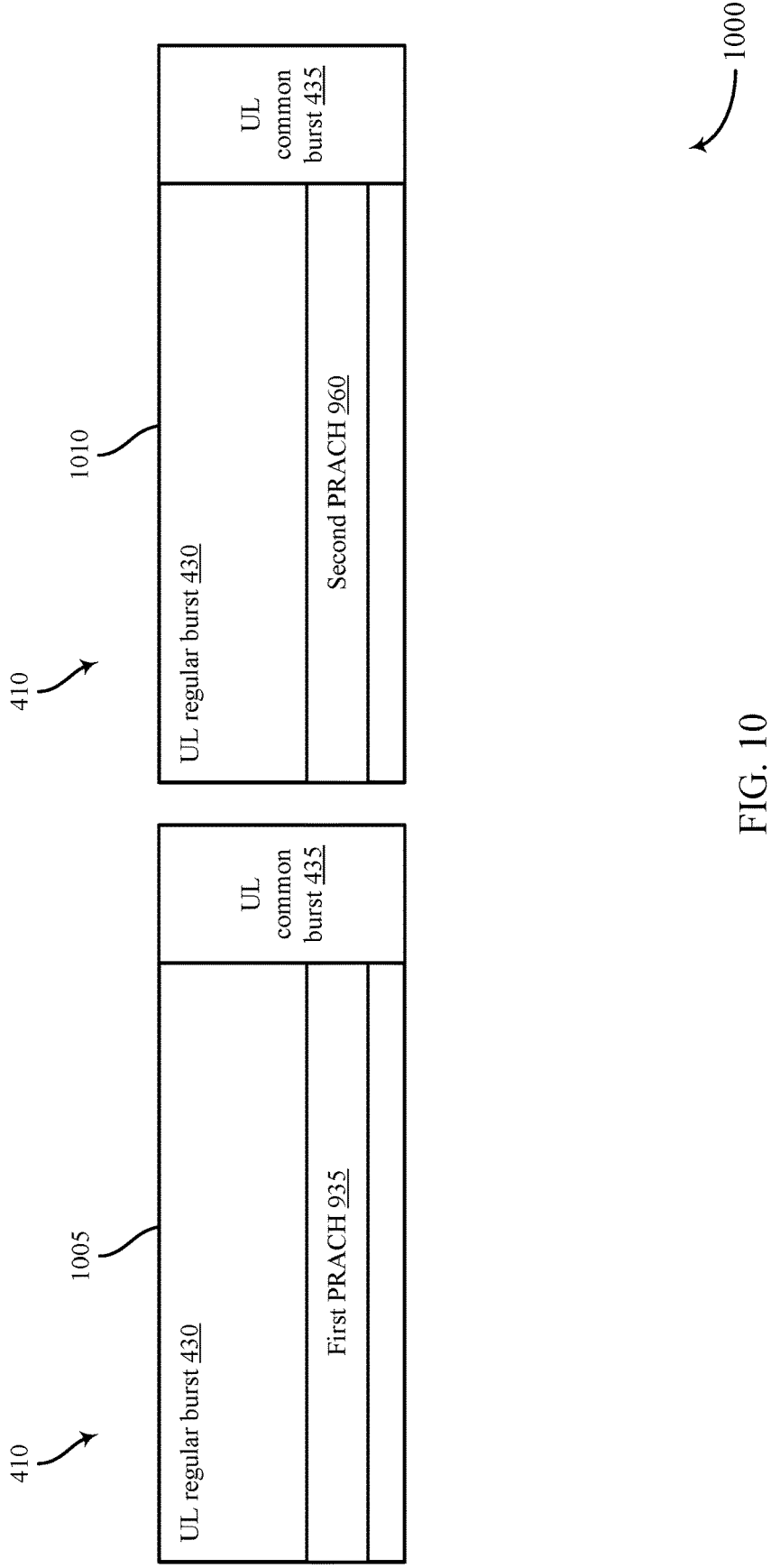
FIG. 10 illustrates an example of a resource structure that supports RACH procedures using multiple PRACH transmissions in accordance with one or more aspects of the present disclosure.

FIG. 10 illustrates an example of a resource structure 1000 for RACH procedures using multiple PRACH transmissions in accordance with one or more aspects of the present disclosure. For example, the resource structure 1000 may be configured to send PRACH transmission over multiple self-contained uplink-centric slots. For example, a first slot 1005 includes the first PRACH transmission 935 and a second slot 1010 includes the second PRACH transmission 960. In such an example, the PRACH transmissions 935, 960 may be transmitted at different times using different time-domain-based communication resources. In some examples, the resource structure 1000 may enable a network to perform PRACH detection with early termination. For example, if the first PRACH transmission is decoded successfully, the second PRACH transmission may never be transmitted or may be canceled. The resource structure 1000 may be used in both a contention-based RACH procedure or a contention-free RACH procedure. In some examples, the resource structure 1000 may be a FDD slot (what is depicted in FIG. 10) or a TDD slot (not depicted in FIG. 10).

Figure 11:
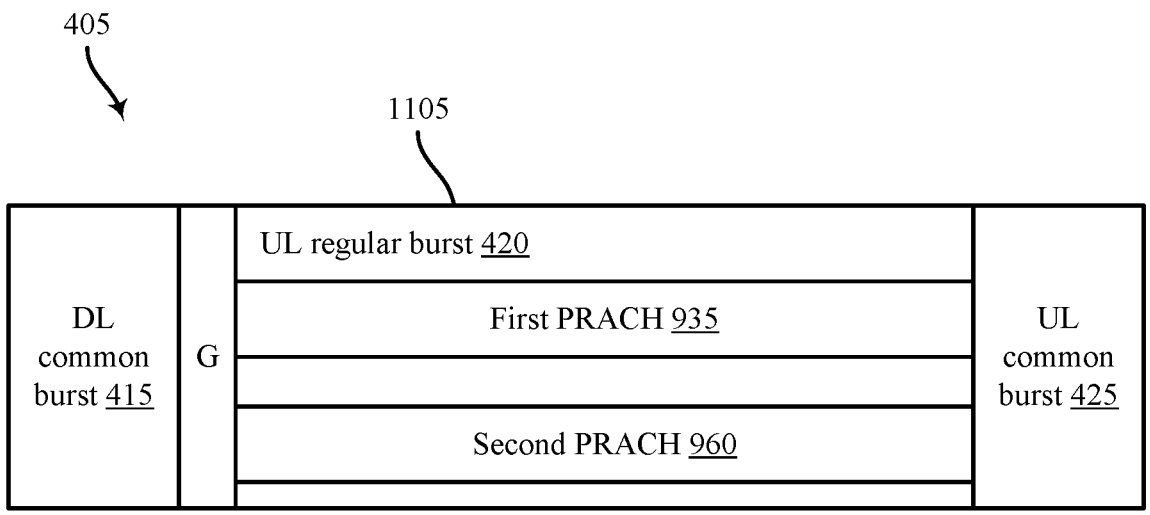
FIG. 11 illustrates an example of a resource structure that supports RACH procedures using multiple PRACH transmissions in accordance with one or more aspects of the present disclosure.
Figure 11:
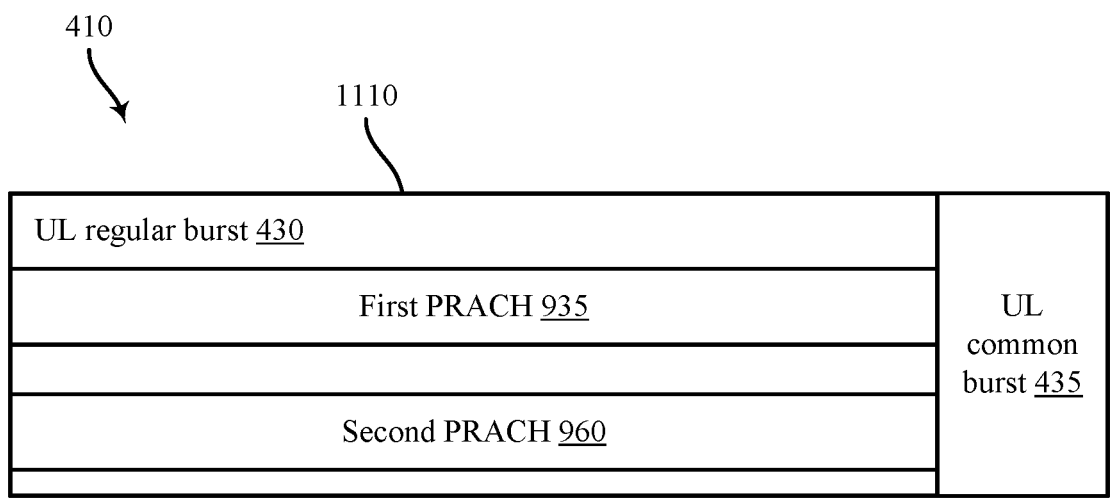

FIG. 11 illustrates an example of a resource structure 1100 for RACH procedures using multiple PRACH transmissions in accordance with one or more aspects of the present disclosure. For example, the resource structure 1100 may be configured to send PRACH transmissions using frequency hopping in the same slot. For example, a slot 1105 includes the first PRACH transmission 935 transmitted using a first frequency sub-band of the slot 1105 and the second PRACH transmission 960 transmitted using a second frequency sub-band of the slot 1105 different than the first frequency sub-band. In such an example, the PRACH transmissions 935, 960 may be transmitted using different frequency-domain-based communication resources. The resource structure 1100 may be used in both a contention-based RACH procedure or a contention-free RACH procedure. In some examples, the resource structure 1100 may be a TDD slot (e.g., slot 1105) or a FDD slot (e.g., 1110).

In some examples, using different slots and frequency-hopping may be combined. For example, a first PRACH transmission may be transmitted during a first slot using a first frequency sub-band of the first slot. A second PRACH transmission may be transmitted during a second slot different from the first slot. In addition, the second PRACH transmission may be transmitted using a second frequency sub-band different than the first frequency sub-band. In some instances, multiple PRACH transmissions may be sent in the first slot using certain frequency resources and the same multiple PRACH transmissions may also be sent in the second slot, but the frequency resources used may be different.

Figure 12:
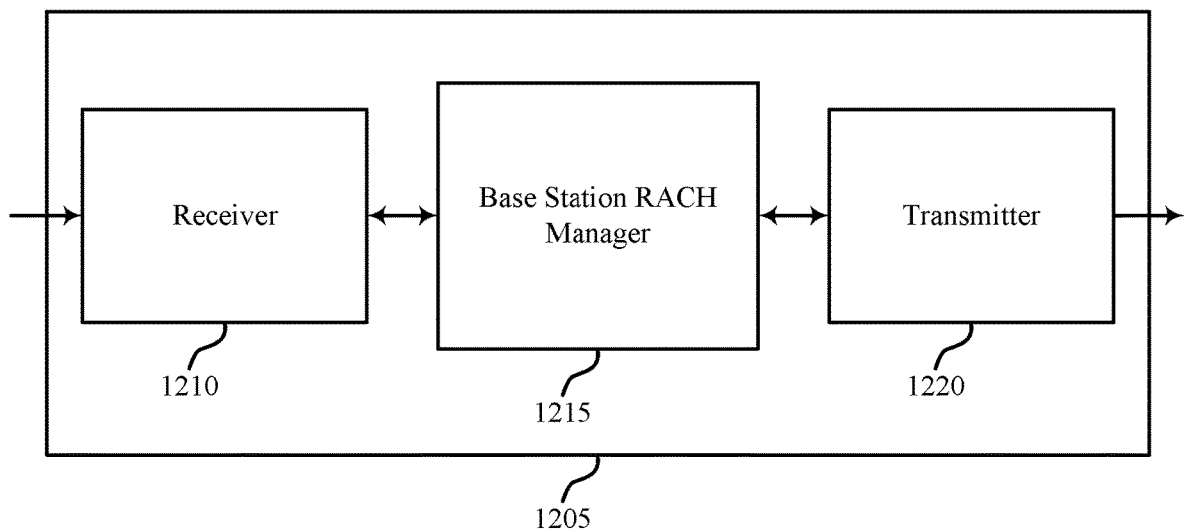
FIGS. 12 through 14 show block diagrams of a device that supports RACH procedures using multiple PRACH transmissions in accordance with one or more aspects of the present disclosure.

FIG. 12 shows a block diagram 1200 of a wireless device 1205 that supports RACH procedures using multiple PRACH transmissions in accordance with one or more aspects of the present disclosure. Wireless device 1205 may be an example of aspects of a base station 105 as described with reference to FIG. 1. Wireless device 1205 may include receiver 1210, base station RACH manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to RACH procedures using multiple PRACH transmissions, etc.). Information may be passed on to other components of the device. The receiver 1210 may be an example of aspects of the transceiver 1535 described with reference to FIG. 15.

Base station RACH manager 1215 may be an example of aspects of the base station RACH manager 1515 described with reference to FIG. 15.

Base station RACH manager 1215 may identify that a first PRACH transmission received at a first reception time is failed to be successfully decoded, the first PRACH message including a first control message, receive a second PRACH transmission at a second reception time based on identifying the undecoded first PRACH transmission, the second PRACH message including a second control message, identify a common message portion present in both the first PRACH transmission and the second PRACH transmission based on the first control message and the second control message, determine a fixed timing between the first PRACH transmission and the second PRACH transmission based on the first reception time and the second reception time, and extract data that is common to both the first PRACH transmission and the second PRACH transmission based on the common message portion and the fixed timing. The base station RACH manager 1215 may also initiate a RACH procedure to establish a communication link between a UE and a base station, receive a set of identical PRACH transmissions, the PRACH transmissions being associated with the RACH procedure, each PRACH transmission being received via different communication resources, extract data included in the PRACH transmissions, and terminate the RACH procedure based on extracting the data from the PRACH transmissions.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
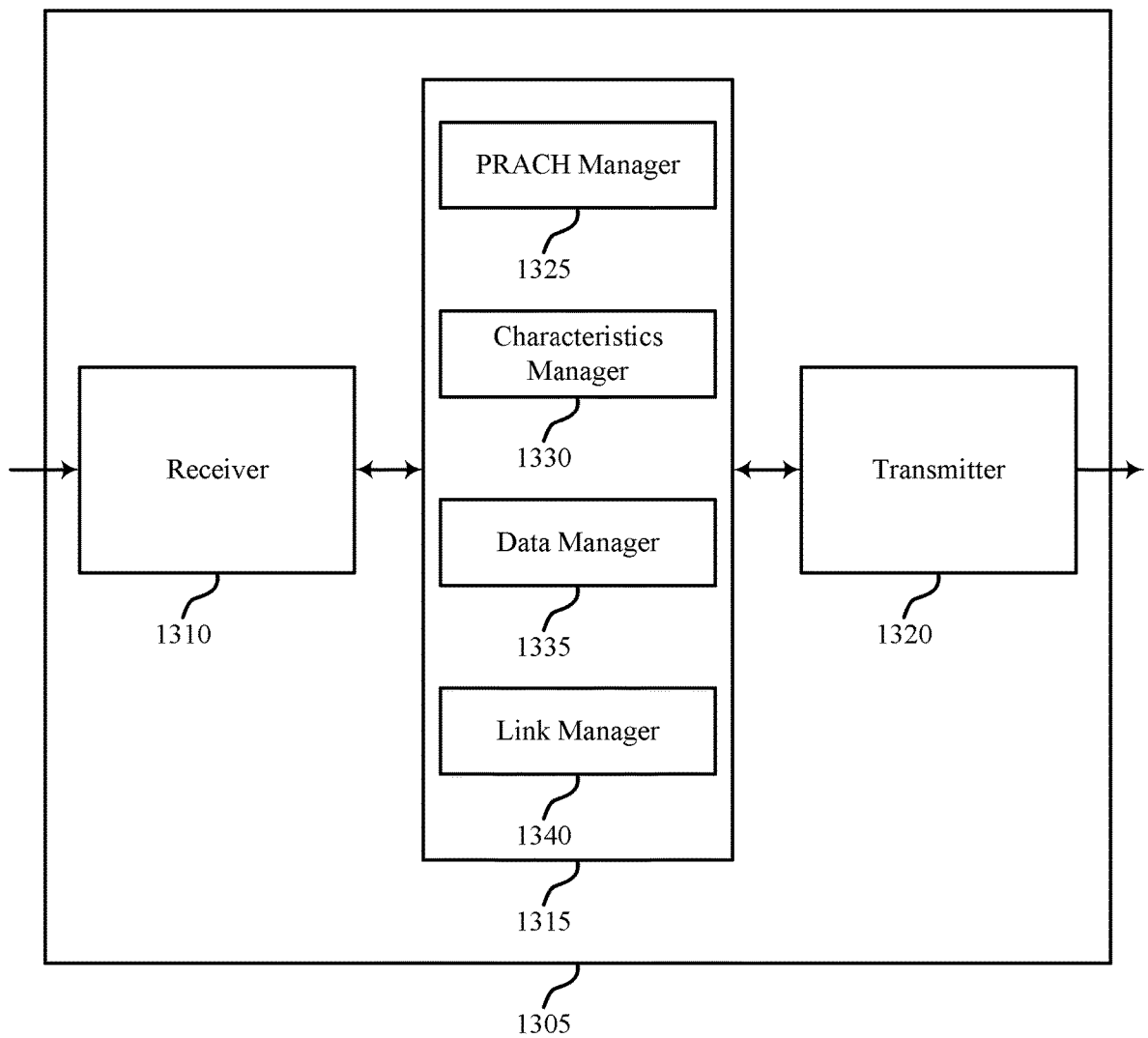

FIG. 13 shows a block diagram 1300 of a wireless device 1305 that supports RACH procedures using multiple PRACH transmissions in accordance with one or more aspects of the present disclosure. Wireless device 1305 may be an example of aspects of a wireless device 1205 or a base station 105 as described with reference to FIGS. 1 and 12. Wireless device 1305 may include receiver 1310, base station RACH manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to RACH procedures using multiple PRACH transmissions, etc.). Information may be passed on to other components of the device. The receiver 1310 may be an example of aspects of the transceiver 1535 described with reference to FIG. 15.

Base station RACH manager 1315 may be an example of aspects of the base station RACH manager 1515 described with reference to FIG. 15.

Base station RACH manager 1315 may also include PRACH manager 1325, characteristics manager 1330, data manager 1335, and link manager 1340.

PRACH manager 1325 may identify that a first physical random access channel (PRACH) transmission received at a first reception time failed to be successfully decoded, the first PRACH message including a first control message, generate a combined PRACH control message, generate the combined PRACH control message is based on the first PRACH transmission, the second PRACH transmission, the common portion, and the fixed timing, where extracting the data is based on the combined PRACH control message, receive a third PRACH transmission based on the second PRACH transmission failing to be successfully decoded, receive a set of identical physical random access channel (PRACH) transmissions, the PRACH transmissions being associated with the RACH procedure, each PRACH transmission being received via different communication resources, receive a second PRACH transmission at a second reception time based on identifying the first PRACH transmission has failed to be successfully decoded, the second PRACH message including a second control message, transmit the RACH response message, generate a combined PRACH control message based on the set of identical PRACH transmissions received, where extracting the data is based on the combined PRACH control message, identify that a first physical random access channel (PRACH) transmission received at a first reception time failed to be successfully decoded, receive a second PRACH transmission at a second reception time based on identifying the first PRACH transmission has failed to be successfully decoded, generate a combined PRACH control message is based on the first PRACH transmission, the second PRACH transmission, and the fixed timing, and generate a RACH response message based on extracting data included in the PRACH transmissions. In some cases, the combined PRACH control message is based on the first PRACH transmission received during a first uplink slot and the second PRACH transmission received during a second uplink slot different from the first uplink slot. In some cases, the first PRACH transmission or the second PRACH transmission are mapped into one or more self-contained uplink slots. In some cases, the combined PRACH control message is based on the first PRACH transmission received during a first uplink slot and the second PRACH transmission received during a second uplink slot different from the first uplink slot. In some cases, the first PRACH transmission or the second PRACH transmission are mapped into one or more self-contained uplink slots.

In some examples, the PRACH manager 1325 may identify that a first PRACH transmission received at a first reception time is unable to be decoded, the first PRACH message including a first control message, receive a second PRACH transmission at a second reception time based on identifying the undecoded first PRACH transmission, the second PRACH message including a second control message, generate a combined PRACH control message based on the first PRACH transmission, the second PRACH transmission, the common portion, and the fixed timing, where extracting the data is based on the combined PRACH control message, receive a third PRACH transmission based on the second PRACH transmission failing to be decoded, receive a set of identical PRACH transmissions, the PRACH transmissions being associated with the RACH procedure, each PRACH transmission being received via different communication resources, generate a RACH response message based on extracting data included in the PRACH transmissions, transmit the RACH response message, and generate a combined PRACH control message based on the set of identical PRACH transmissions received, where extracting the data is based on the combined PRACH control message. In some cases, the first PRACH transmission or the second PRACH transmission are mapped into one or more self-contained uplink slots.

Characteristics manager 1330 may identify a common message portion present in both the first PRACH transmission and the second PRACH transmission based on the first control message and the second control message, identify the common message portion further includes identifying a location of the first control message in the first PRACH transmission, determine a fixed timing between the first PRACH transmission and the second PRACH transmission based on the first reception time and the second reception time, and initiate a contention-free random access procedure, where generating the combined PRACH control message is based on initiating the contention-free random access procedure. In some cases, the method further including identifying a location of the second control message in the second PRACH transmission, where generating the combined PRACH control message is based on the location of the first control message being the same as the location of the second control message. In some cases, identifying the common message portion further includes: determining that the first PRACH transmission is the same as the second PRACH transmission. In some cases, identifying the common message portion further includes: determining that a type of the first PRACH transmission is the same as a type of the second PRACH transmission, where extracting the data is based on the determining. In some cases, the method further including identifying a location of the second control message in the second PRACH transmission, where extracting the data is based on the location of the first control message being the same as the location of the second control message. In some cases, identifying the common message portion further includes: determining that the first PRACH transmission is the same as the second PRACH transmission. In some cases, identifying the common message portion further includes: determining that a type of the first PRACH transmission is the same as a type of the second PRACH transmission, where generating the combined PRACH control message is based on the determining.

In some examples, the characteristics manager 1330 may identify a common message portion present in both the first PRACH transmission and the second PRACH transmission based on the first control message and the second control message, determine a fixed timing between the first PRACH transmission and the second PRACH transmission based on the first reception time and the second reception time, and identify a location of the second control message in the second PRACH transmission, where extracting the data is based on the location of the first control message being the same as the location of the second control message. In some cases, identifying the common message portion further includes: determining that the first PRACH transmission is the same as the second PRACH transmission. In some cases, identifying the common message portion further includes: determining that a type of the first PRACH transmission is the same as a type of the second PRACH transmission, where extracting the data is based on the determining. In some cases, identifying the common message portion further includes: identifying a location of the first control message in the first PRACH transmission.

Data manager 1335 may extract data that is common to both the first PRACH transmission and the second PRACH transmission based on the common message portion and the fixed timing, extract the data is based on the UE being in a radio resource control (RRC) active state, extract data included in the PRACH transmissions, extract data that is common to both the first PRACH transmission and the second PRACH transmission based on the fixed timing, and generate the combined PRACH control message is based on the UE being in a RRC active state. In some cases, extracting the data further includes: extracting data from one of the set of identical PRACH transmissions received.

In some examples, the data manager 1335 may extract data that is common to both the first PRACH transmission and the second PRACH transmission based on the common message portion and the fixed timing, extract the data is based on the UE being in a radio resource control (RRC) active state, and extract data included in the PRACH transmissions. In some cases, extracting the data further includes: extracting data from one of the set of identical PRACH transmissions received.

Link manager 1340 may initiate a contention-free random access procedure, where extracting the data is based on initiating the contention-free random access procedure, transmit a PRACH transmission schedule having a set of PRACH transmission opportunities based on the initiating, where generating the combined PRACH control message is based on the PRACH transmission schedule, terminate the RACH procedure based on the number of received PRACH transmissions being equal to or greater than a threshold number of PRACH transmissions, initiate a random access (RACH) procedure to establish a communication link between a UE and a cell of a base station, transmit a PRACH transmission schedule having a set of PRACH transmission opportunities based on the initiating, where extracting the data is based on the PRACH transmission schedule, initiate a random access (RACH) procedure to establish a communication link between a UE and a base station, identify a number of received PRACH transmissions, identify a number of received PRACH transmissions, where terminating the RACH procedure is based on the number of received PRACH transmissions being equal to or greater than a threshold number of PRACH transmissions, and terminate the RACH procedure based on extracting the data from the PRACH transmissions.

In some examples, link manager 1340 may initiate a contention-free random access procedure, where extracting the data is based on initiating the contention-free random access procedure, identify a number of received PRACH transmissions, terminate the RACH procedure based on the number of received PRACH transmissions being equal to or greater than a threshold number of PRACH transmissions, initiate a RACH procedure to establish a communication link between a UE and a cell of a base station, transmit a PRACH transmission schedule having a set of PRACH transmission opportunities based on the initiating, where extracting the data is based on the PRACH transmission schedule, initiate a RACH procedure to establish a communication link between a UE and a base station, terminate the RACH procedure based on extracting the data from the PRACH transmissions, and identify a number of received PRACH transmissions, where terminating the RACH procedure is based on the number of received PRACH transmissions being equal to or greater than a threshold number of PRACH transmissions.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
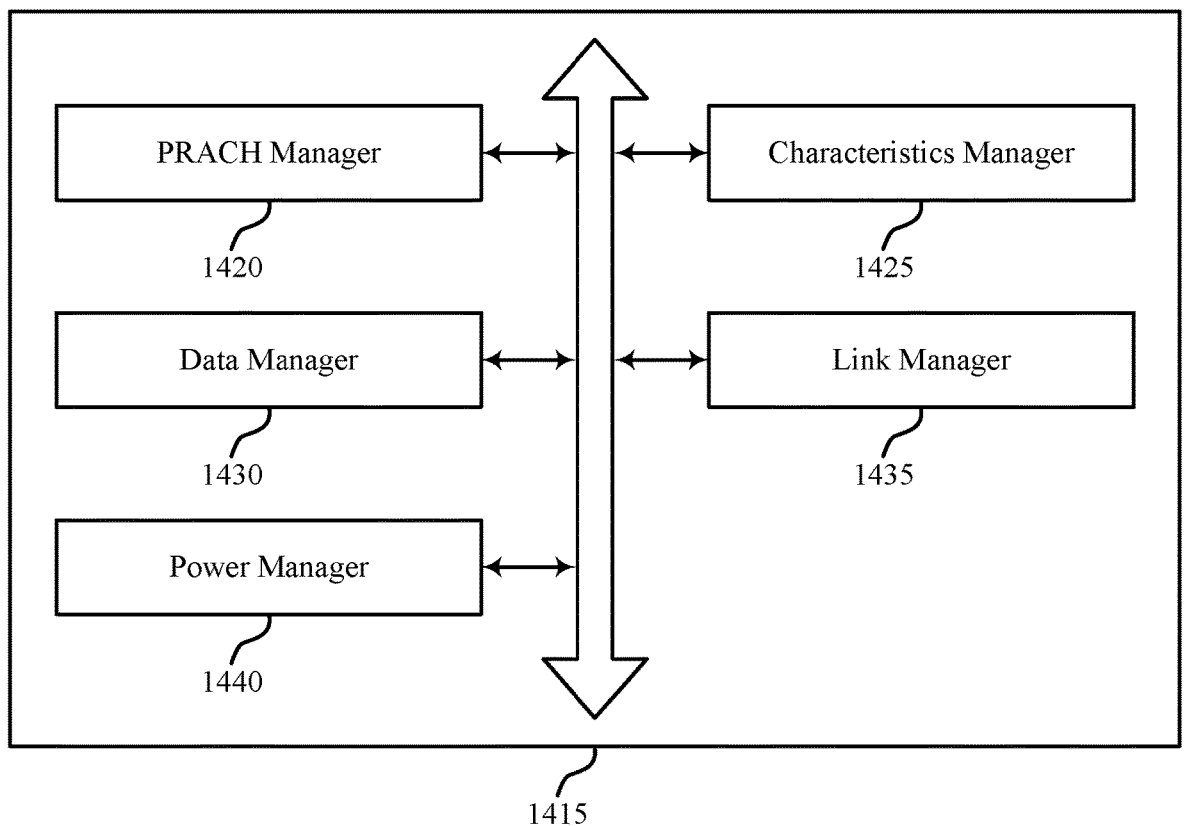

FIG. 14 shows a block diagram 1400 of a base station RACH manager 1415 that supports RACH procedures using multiple PRACH transmissions in accordance with one or more aspects of the present disclosure. The base station RACH manager 1415 may be an example of aspects of a base station RACH manager 1215, a base station RACH manager 1315, or a base station RACH manager 1515 described with reference to FIGS. 12, 13, and 15. The base station RACH manager 1415 may include PRACH manager 1420, characteristics manager 1425, data manager 1430, link manager 1435, and power manager 1440. Each of these modules may communicate, directly or indirectly, with one another (e.g., via one or more buses).

PRACH manager 1420 may identify that a first physical random access channel (PRACH) transmission received at a first reception time failed to be successfully decoded, the first PRACH message including a first control message, generate a combined PRACH control message, generate the combined PRACH control message is based on the first PRACH transmission, the second PRACH transmission, the common portion, and the fixed timing, where extracting the data is based on the combined PRACH control message, receive a third PRACH transmission based on the second PRACH transmission failing to be successfully decoded, receive a set of identical physical random access channel (PRACH) transmissions, the PRACH transmissions being associated with the RACH procedure, each PRACH transmission being received via different communication resources, receive a second PRACH transmission at a second reception time based on identifying the first PRACH transmission has failed to be successfully decoded, the second PRACH message including a second control message, transmit the RACH response message, generate a combined PRACH control message based on the set of identical PRACH transmissions received, where extracting the data is based on the combined PRACH control message, identify that a first physical random access channel (PRACH) transmission received at a first reception time failed to be successfully decoded, receive a second PRACH transmission at a second reception time based on identifying the first PRACH transmission has failed to be successfully decoded, generate a combined PRACH control message is based on the first PRACH transmission, the second PRACH transmission, and the fixed timing, and generate a RACH response message based on extracting data included in the PRACH transmissions. In some cases, the combined PRACH control message is based on the first PRACH transmission received during a first uplink slot and the second PRACH transmission received during a second uplink slot different from the first uplink slot. In some cases, the first PRACH transmission or the second PRACH transmission are mapped into one or more self-contained uplink slots. In some cases, the combined PRACH control message is based on the first PRACH transmission received during a first uplink slot and the second PRACH transmission received during a second uplink slot different from the first uplink slot. In some cases, the first PRACH transmission or the second PRACH transmission are mapped into one or more self-contained uplink slots.

In some examples, the PRACH manager 1420 may identify that a first PRACH transmission received at a first reception time is unable to be decoded, the first PRACH message including a first control message, receive a second PRACH transmission at a second reception time based on identifying the undecoded first PRACH transmission, the second PRACH message including a second control message, generate a combined PRACH control message based on the first PRACH transmission, the second PRACH transmission, the common portion, and the fixed timing, where extracting the data is based on the combined PRACH control message, receive a third PRACH transmission based on the second PRACH transmission failing to be decoded, receive a set of identical PRACH transmissions, the PRACH transmissions being associated with the RACH procedure, each PRACH transmission being received via different communication resources, generate a RACH response message based on extracting data included in the PRACH transmissions, transmit the RACH response message, and generate a combined PRACH control message based on the set of identical PRACH transmissions received, where extracting the data is based on the combined PRACH control message. In some cases, the first PRACH transmission or the second PRACH transmission are mapped into one or more self-contained uplink slots.

Characteristics manager 1425 may identify a common message portion present in both the first PRACH transmission and the second PRACH transmission based on the first control message and the second control message, identify the common message portion further includes identifying a location of the first control message in the first PRACH transmission, determine a fixed timing between the first PRACH transmission and the second PRACH transmission based on the first reception time and the second reception time, and initiate a contention-free random access procedure, where generating the combined PRACH control message is based on initiating the contention-free random access procedure. In some cases, the method further including identifying a location of the second control message in the second PRACH transmission, where generating the combined PRACH control message is based on the location of the first control message being the same as the location of the second control message. In some cases, identifying the common message portion further includes: determining that the first PRACH transmission is the same as the second PRACH transmission. In some cases, identifying the common message portion further includes: determining that a type of the first PRACH transmission is the same as a type of the second PRACH transmission, where extracting the data is based on the determining. In some cases, the method further including identifying a location of the second control message in the second PRACH transmission, where extracting the data is based on the location of the first control message being the same as the location of the second control message. In some cases, identifying the common message portion further includes: determining that the first PRACH transmission is the same as the second PRACH transmission. In some cases, identifying the common message portion further includes: determining that a type of the first PRACH transmission is the same as a type of the second PRACH transmission, where generating the combined PRACH control message is based on the determining.

In some examples, the characteristics manager 1425 may identify a common message portion present in both the first PRACH transmission and the second PRACH transmission based on the first control message and the second control message, determine a fixed timing between the first PRACH transmission and the second PRACH transmission based on the first reception time and the second reception time, and identify a location of the second control message in the second PRACH transmission, where extracting the data is based on the location of the first control message being the same as the location of the second control message. In some cases, identifying the common message portion further includes: determining that the first PRACH transmission is the same as the second PRACH transmission. In some cases, identifying the common message portion further includes: determining that a type of the first PRACH transmission is the same as a type of the second PRACH transmission, where extracting the data is based on the determining. In some cases, identifying the common message portion further includes: identifying a location of the first control message in the first PRACH transmission.

Data manager 1430 may extract data that is common to both the first PRACH transmission and the second PRACH transmission based on the common message portion and the fixed timing, extract the data is based on the UE being in a RRC active state, extract data included in the PRACH transmissions, extract data that is common to both the first PRACH transmission and the second PRACH transmission based on the fixed timing, and generate the combined PRACH control message is based on the UE being in a RRC active state. In some cases, extracting the data further includes: extracting data from one of the set of identical PRACH transmissions received.

In some examples, the data manager 1430 may extract data that is common to both the first PRACH transmission and the second PRACH transmission based on the common message portion and the fixed timing, extract the data is based on the UE being in a RRC active state, and extract data included in the PRACH transmissions. In some cases, extracting the data further includes: extracting data from one of the set of identical PRACH transmissions received.

Link manager 1435 may initiate a contention-free random access procedure, where extracting the data is based on initiating the contention-free random access procedure, transmit a PRACH transmission schedule having a set of PRACH transmission opportunities based on the initiating, where generating the combined PRACH control message is based on the PRACH transmission schedule, terminate the RACH procedure based on the number of received PRACH transmissions being equal to or greater than a threshold number of PRACH transmissions, initiate a random access (RACH) procedure to establish a communication link between a UE and a cell of a base station, transmit a PRACH transmission schedule having a set of PRACH transmission opportunities based on the initiating, where extracting the data is based on the PRACH transmission schedule, initiate a random access (RACH) procedure to establish a communication link between a UE and a base station, identify a number of received PRACH transmissions, identify a number of received PRACH transmissions, where terminating the RACH procedure is based on the number of received PRACH transmissions being equal to or greater than a threshold number of PRACH transmissions, and terminate the RACH procedure based on extracting the data from the PRACH transmissions.

In some examples, the link manager 1435 may initiate a contention-free random access procedure, where extracting the data is based on initiating the contention-free random access procedure, identify a number of received PRACH transmissions, terminate the RACH procedure based on the number of received PRACH transmissions being equal to or greater than a threshold number of PRACH transmissions, initiate a RACH procedure to establish a communication link between a UE and a cell of a base station, transmit a PRACH transmission schedule having a set of PRACH transmission opportunities based on the initiating, where extracting the data is based on the PRACH transmission schedule, initiate a RACH procedure to establish a communication link between a UE and a base station, terminate the RACH procedure based on extracting the data from the PRACH transmissions, and identify a number of received PRACH transmissions, where terminating the RACH procedure is based on the number of received PRACH transmissions being equal to or greater than a threshold number of PRACH transmissions.

Power manager 1440 may be configured to modify the power levels of PRACH transmissions. In some cases, the first PRACH transmission and the second PRACH transmission are based on an outer loop power control. In some cases, a transmission power of the second PRACH transmission is greater than a transmission power of the first PRACH transmission. In some cases, the first PRACH transmission and the second PRACH transmission are based on an outer loop power control. In some cases, a transmission power of the second PRACH transmission is greater than a transmission power of the first PRACH transmission. In some cases, the first PRACH transmission and the second PRACH transmission are based on an outer loop power control. In some cases, a transmission power of the second PRACH transmission is greater than a transmission power of the first PRACH transmission.

Figure 15:
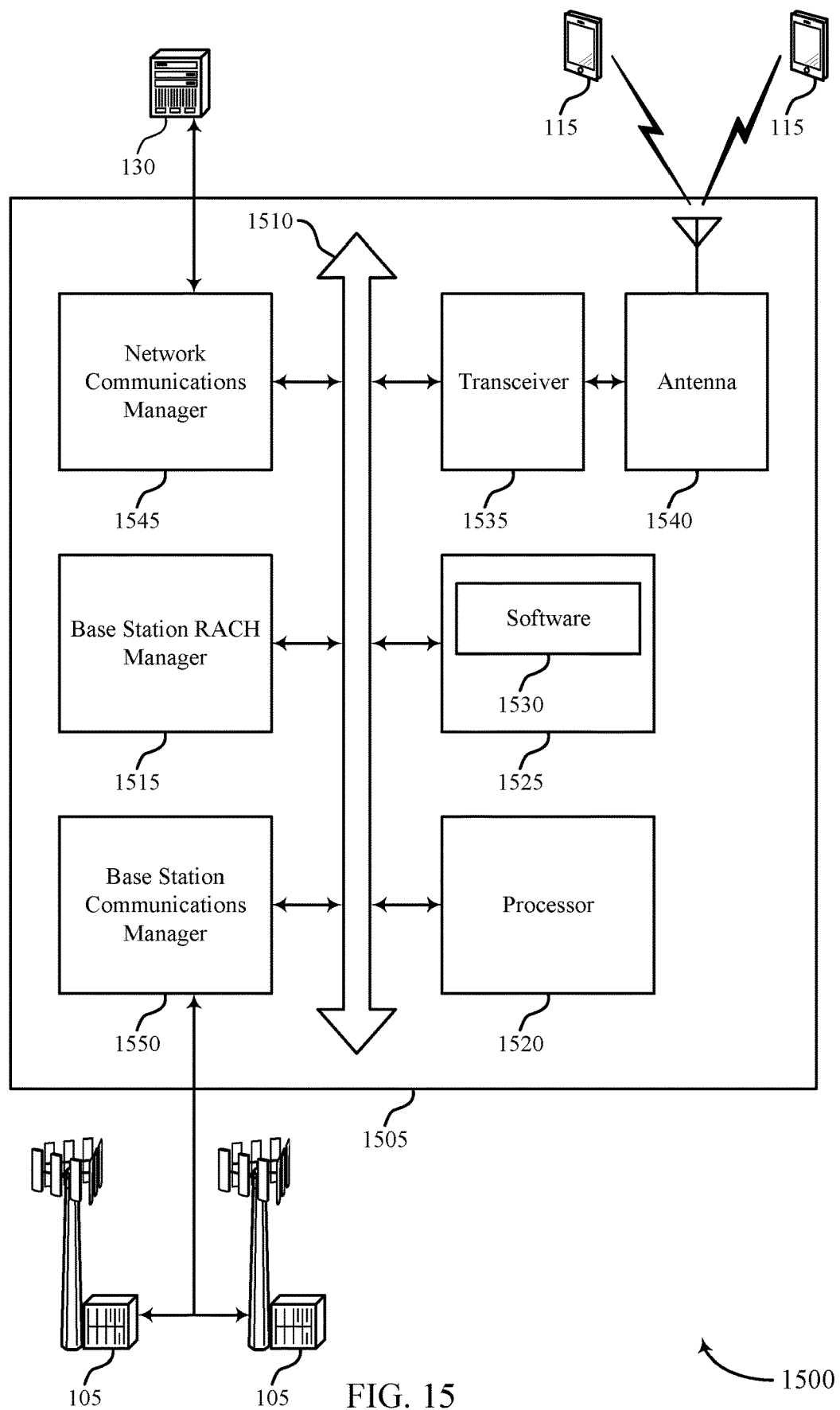
FIG. 15 illustrates a block diagram of a system including a base station that supports RACH procedures using multiple PRACH transmissions in accordance with one or more aspects of the present disclosure.

FIG. 15 shows a diagram of a system 1500 including a device 1505 that supports RACH procedures using multiple PRACH transmissions in accordance with one or more aspects of the present disclosure. Device 1505 may be an example of or include the components of wireless device 1205, wireless device 1305, or a base station 105 as described above, e.g., with reference to FIGS. 1, 12 and 13. Device 1505 may include components for bi-directional voice and data communications including components for transmitting and receiving communications, including base station RACH manager 1515, processor 1520, memory 1525, software 1530, transceiver 1535, antenna 1540, network communications manager 1545, and base station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting RACH procedures using multiple PRACH transmissions).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware and/or software operation such as the interaction with peripheral components or devices.

Software 1530 may include code to implement aspects of the present disclosure, including code to support RACH procedures using multiple PRACH transmissions. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Base station communications manager 1550 may manage communications with other base station 105, and may include a controller or scheduler for controlling communications with UEs 115 in cooperation with other base stations 105. For example, the base station communications manager 1550 may coordinate scheduling for transmissions to UEs 115 for various interference mitigation techniques such as beamforming or joint transmission. In some examples, base station communications manager 1550 may provide an X2 interface within an Long Term Evolution (LTE)/LTE-A wireless communication network technology to provide communication between base stations 105.

Figure 16:
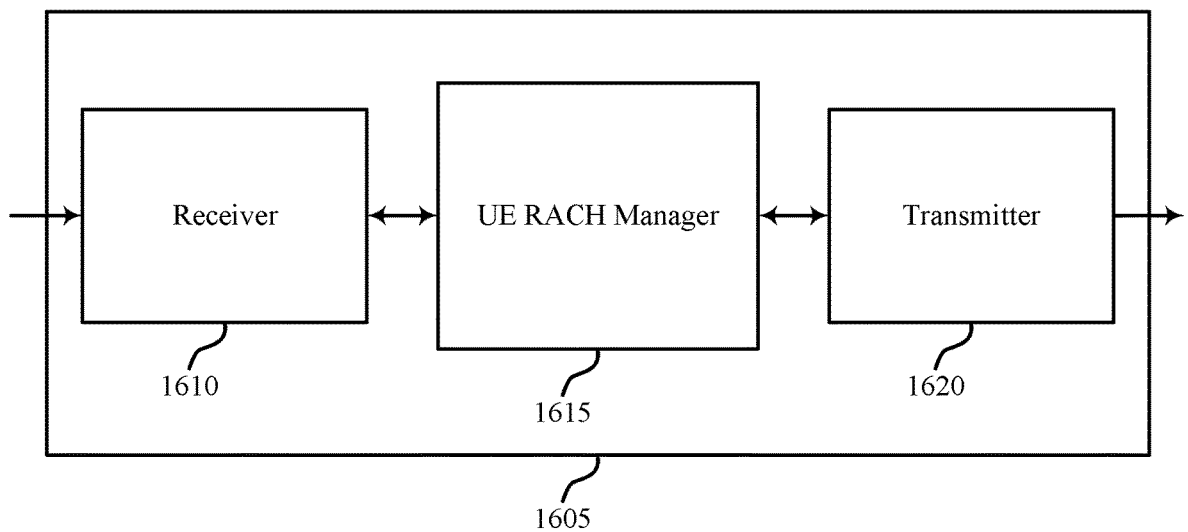
FIGS. 16 through 18 show block diagrams of a device that supports RACH procedures using multiple PRACH transmissions in accordance with one or more aspects of the present disclosure.

FIG. 16 shows a block diagram 1600 of a wireless device 1605 that supports RACH procedures using multiple PRACH transmissions in accordance with one or more aspects of the present disclosure. Wireless device 1605 may be an example of aspects of a UE 115 as described with reference to FIG. 1. Wireless device 1605 may include receiver 1610, UE RACH manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to RACH procedures using multiple PRACH transmissions, etc.). Information may be passed on to other components of the device. The receiver 1610 may be an example of aspects of the transceiver 1935 described with reference to FIG. 19.

UE RACH manager 1615 may be an example of aspects of the UE RACH manager 1915 described with reference to FIG. 19.

UE RACH manager 1615 may transmit a PRACH transmission having a message portion at a first time, receive an indication that the PRACH transmission failed to be successfully decoded, determine a fixed timing between the first time associated with the transmission of the PRACH transmission and a second time associated with a retransmission of the PRACH transmission, and retransmit the PRACH transmission based on the fixed timing. The UE RACH manager 1615 may also initiate a RACH procedure to establish a communication link between a UE and a base station, transmit, by the UE, a PRACH transmission via a first set of communication resources, the first PRACH transmission being associated with the RACH procedure, and retransmit, by the UE, the PRACH transmission via a second set of communication resources different from the first set of communication resources.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may include a single antenna, or it may include a set of antennas.

Figure 17:
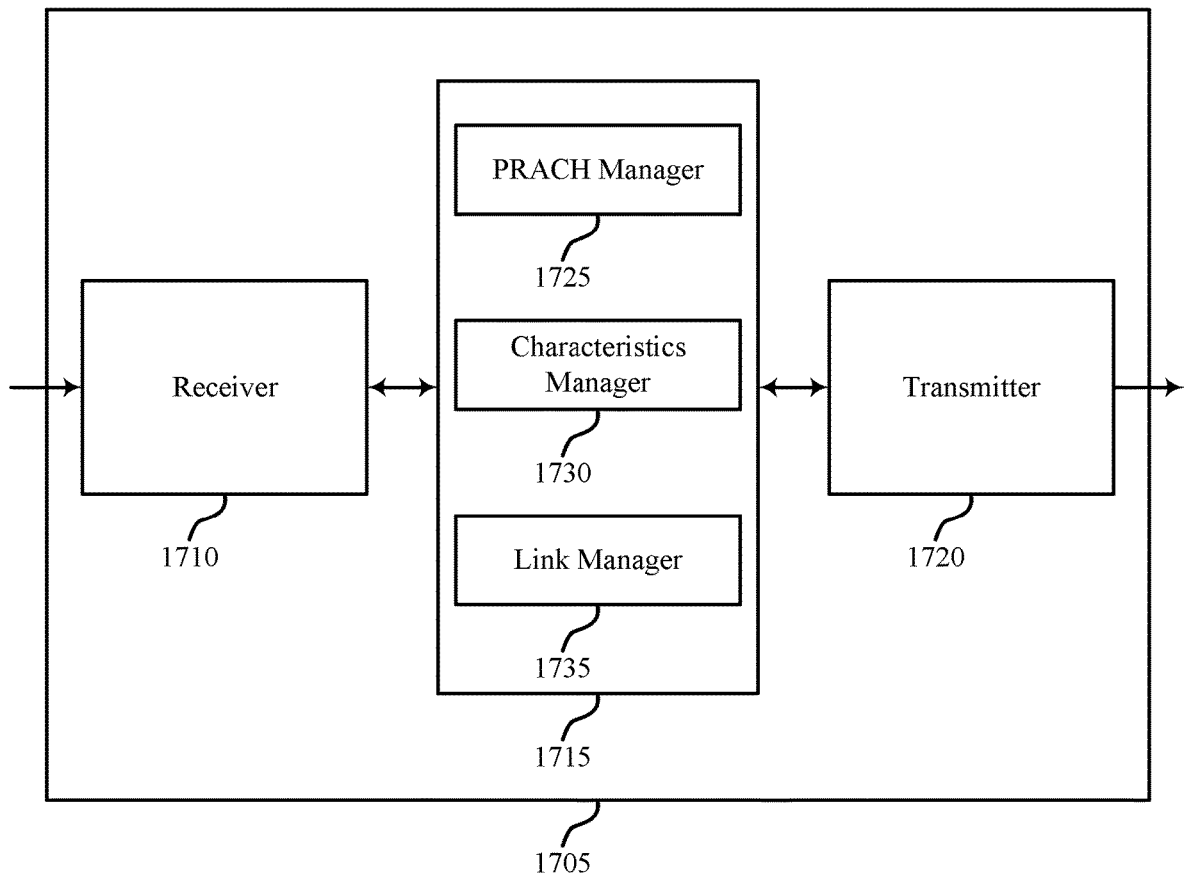

FIG. 17 shows a block diagram 1700 of a wireless device 1705 that supports RACH procedures using multiple PRACH transmissions in accordance with one or more aspects of the present disclosure. Wireless device 1705 may be an example of aspects of a wireless device 1605 or a UE 115 as described with reference to FIGS. 1 and 16. Wireless device 1705 may include receiver 1710, UE RACH manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to RACH procedures using multiple PRACH transmissions, etc.). Information may be passed on to other components of the device. The receiver 1710 may be an example of aspects of the transceiver 1935 described with reference to FIG. 19.

UE RACH manager 1715 may be an example of aspects of the UE RACH manager 1915 described with reference to FIG. 19.

UE RACH manager 1715 may also include PRACH manager 1725, characteristics manager 1730, and link manager 1735.

PRACH manager 1725 may transmit a PRACH transmission having a message portion at a first time, receive an indication that the PRACH transmission failed to be successfully decoded, retransmit the PRACH transmission based on the fixed timing, determine that the PRACH transmission was not decoded successfully based on an absence of the indication, where retransmitting the PRACH transmission is based on the determining, transmit, by the UE, a PRACH transmission via a first set of communication resources, the first PRACH transmission being associated with the RACH procedure, and retransmit, by the UE, the PRACH transmission via a second set of communication resources different from the first set of communication resources. In some cases, the first set of communication resources is a first frequency sub-band of a slot and the second set of communication resources is second frequency sub-band of the slot, the second frequency sub-band being different from the first frequency sub-band. In some cases, the first set of communication resources includes a first slot and a first frequency sub-band of the first slot. In some cases, the second set of communication resources includes a second slot different from the first slot and a second frequency sub-band of the second slot different from the first frequency sub-band.

Characteristics manager 1730 may determine a fixed timing between the first time associated with the transmission of the PRACH transmission and a second time associated with a retransmission of the PRACH transmission and link a first PRACH transmission and a second PRACH transmission such that the base station is configured to combine the first PRACH transmission and the second PRACH transmission.

Link manager 1735 may receive a transmission schedule that includes a set of PRACH transmission opportunities associated with the RACH procedure, transmit the first PRACH transmission and the second PRACH transmission based on the transmission schedule, initiate a RACH procedure to establish a communication link between a UE and a base station, receive an indication from the base station indicating that the PRACH transmission has been decoded successfully, terminate RACH procedure based on the PRACH transmission being decoded successfully, and transmit a PRACH transmission during each PRACH transmission opportunity in the transmission schedule. In some cases, the first set of communication resources is a first uplink slot and the second set of communication resources is a second uplink slot that is different from the first uplink slot.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may include a single antenna, or it may include a set of antennas.

Figure 18:
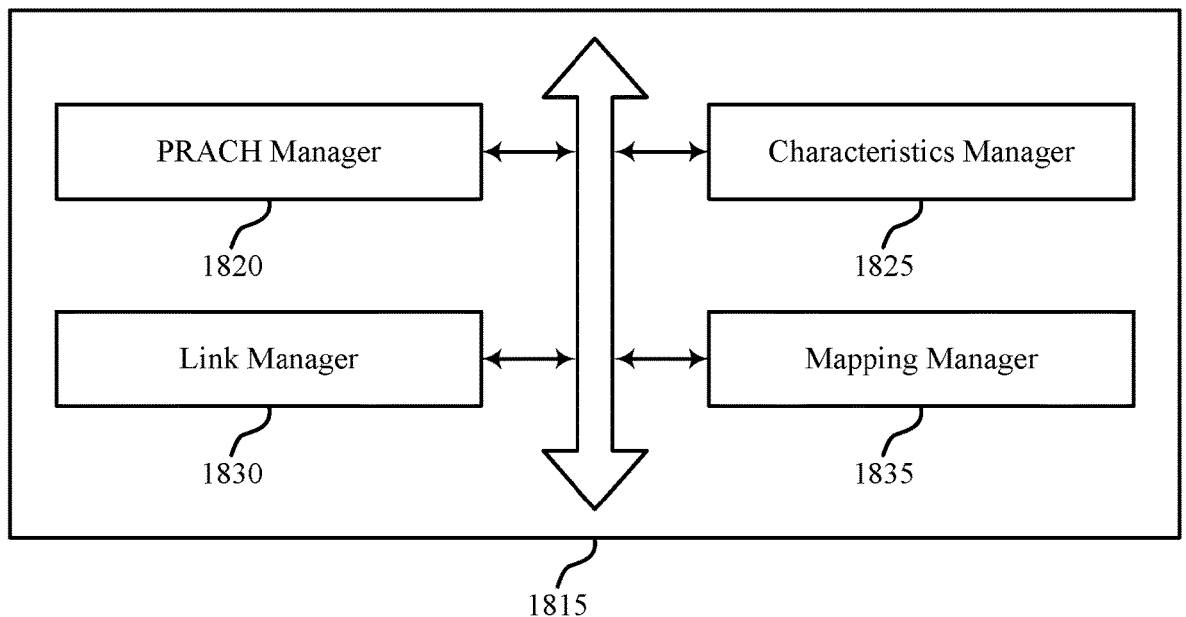

FIG. 18 shows a block diagram 1800 of a UE RACH manager 1815 that supports RACH procedures using multiple PRACH transmissions in accordance with one or more aspects of the present disclosure. The UE RACH manager 1815 may be an example of aspects of a UE RACH manager 1915 described with reference to FIGS. 16, 17, and 19. The UE RACH manager 1815 may include PRACH manager 1820, characteristics manager 1825, link manager 1830, and mapping manager 1835. Each of these modules may communicate, directly or indirectly, with one another (e.g., via one or more buses).

PRACH manager 1820 may transmit a PRACH transmission having a message portion at a first time, receive an indication that the PRACH transmission failed to be successfully decoded, retransmit the PRACH transmission based on the fixed timing, determine that the PRACH transmission was not decoded successfully based on an absence of the indication, where retransmitting the PRACH transmission is based on the determining, transmit, by the UE, a PRACH transmission via a first set of communication resources, the first PRACH transmission being associated with the RACH procedure, and retransmit, by the UE, the PRACH transmission via a second set of communication resources different from the first set of communication resources. In some cases, the first set of communication resources is a first frequency sub-band of a slot and the second set of communication resources is second frequency sub-band of the slot, the second frequency sub-band being different from the first frequency sub-band. In some cases, the first set of communication resources includes a first slot and a first frequency sub-band of the first slot. In some cases, the second set of communication resources includes a second slot different from the first slot and a second frequency sub-band of the second slot different from the first frequency sub-band.

Characteristics manager 1825 may determine a fixed timing between the first time associated with the transmission of the PRACH transmission and a second time associated with a retransmission of the PRACH transmission and link a first PRACH transmission and a second PRACH transmission such that the base station is configured to combine the first PRACH transmission and the second PRACH transmission.

Link manager 1830 may receive a transmission schedule that includes a set of PRACH transmission opportunities associated with the RACH procedure, transmit the first PRACH transmission and the second PRACH transmission based on the transmission schedule, initiate a RACH procedure to establish a communication link between a UE and a base station, receive an indication from the base station indicating that the PRACH transmission has been decoded successfully, terminate RACH procedure based on the PRACH transmission being decoded successfully, and transmit a PRACH transmission during each PRACH transmission opportunity in the transmission schedule. In some cases, the first set of communication resources is a first uplink slot and the second set of communication resources is a second uplink slot that is different from the first uplink slot.

Mapping manager 1835 may map the first PRACH transmission and the second PRACH transmission to one or more uplink-centric slots and map the PRACH transmission to one or more uplink-centric slots.

Figure 19:
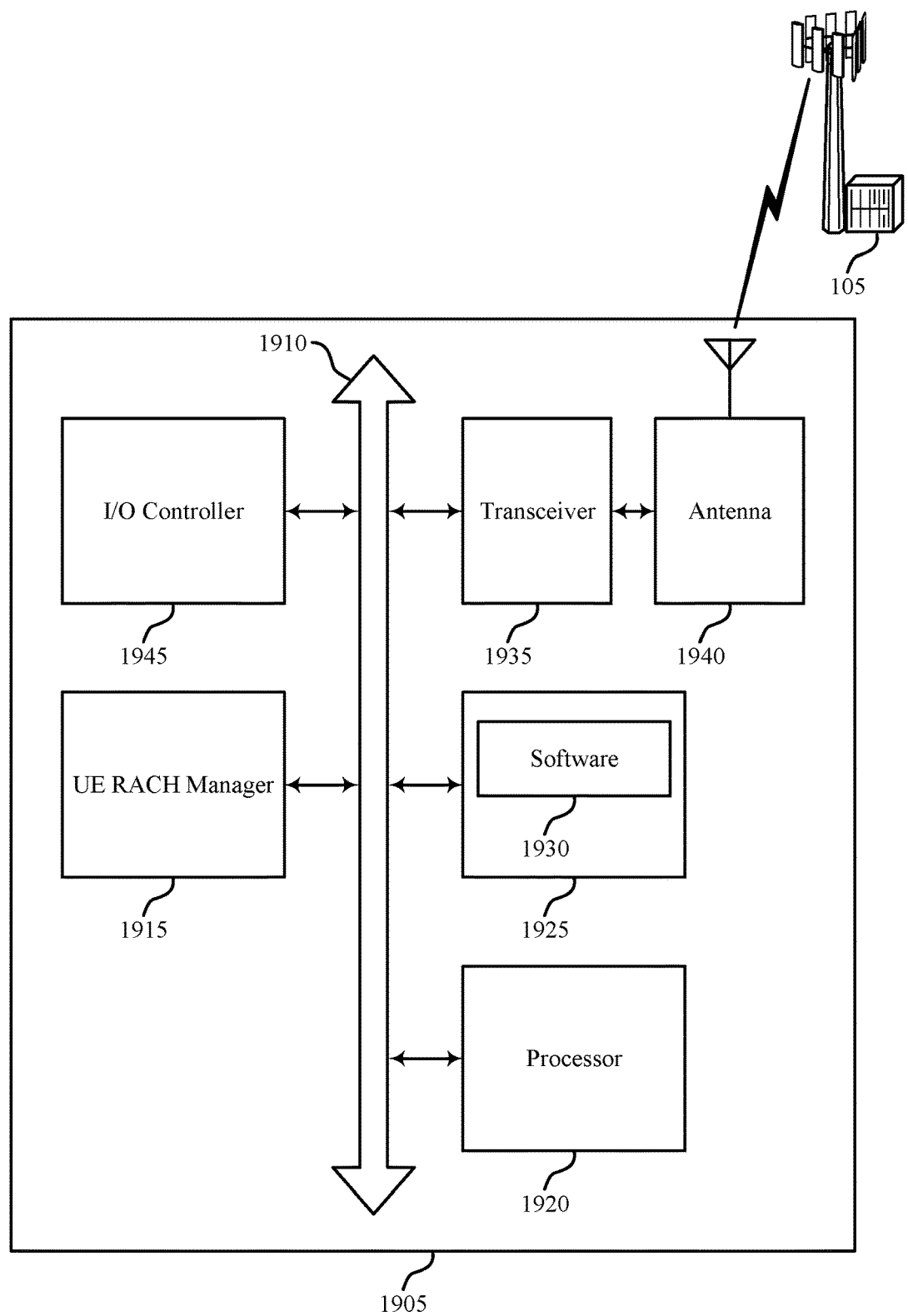
FIG. 19 illustrates a block diagram of a system including a UE that supports RACH procedures using multiple PRACH transmissions in accordance with one or more aspects of the present disclosure.

FIG. 19 shows a diagram of a system 1900 including a device 1905 that supports RACH procedures using multiple PRACH transmissions in accordance with one or more aspects of the present disclosure. Device 1905 may be an example of or include the components of UE 115 as described above, e.g., with reference to FIG. 1. Device 1905 may include components for bi-directional voice and data communications including components for transmitting and receiving communications, including UE RACH manager 1915, processor 1920, memory 1925, software 1930, transceiver 1935, antenna 1940, and I/O controller 1945. These components may be in electronic communication via one or more busses (e.g., bus 1910). Device 1905 may communicate wirelessly with one or more base stations 105.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting RACH procedures using multiple PRACH transmissions).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware and/or software operation such as the interaction with peripheral components or devices.

Software 1930 may include code to implement aspects of the present disclosure, including code to support RACH procedures using multiple PRACH transmissions. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

I/O controller 1945 may manage input and output signals for device 1905. I/O controller 1945 may also manage peripherals not integrated into device 1905. In some cases, I/O controller 1945 may represent a physical connection or port to an external peripheral. In some cases, I/O controller 1945 may utilize an operating system such as iOS®, ANDROID®, MS-DOS®, MS-WINDOWS®, OS/2®, UNIX®, LINUX®, or another known operating system.

Figure 20:
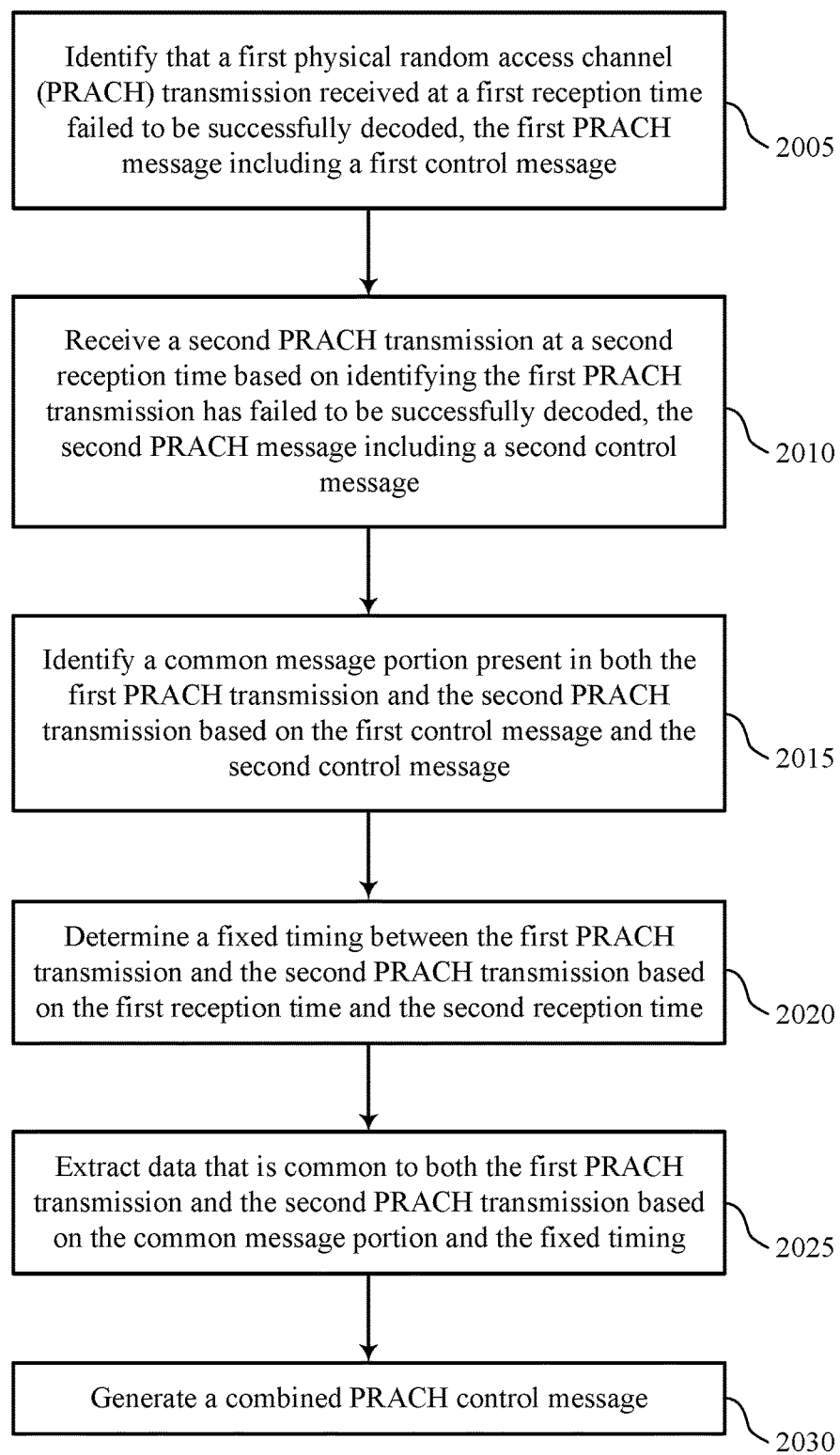
FIGS. 20 through 25 illustrate methods for RACH procedures using multiple PRACH transmissions in accordance with one or more aspects of the present disclosure.

FIG. 20 shows a flowchart illustrating a method 2000 for RACH procedures using multiple PRACH transmissions in accordance with one or more aspects of the present disclosure in accordance with one or more aspects of the present disclosure. The operations of method 2000 may be implemented by a base station 105 or its components as described herein. For example, the operations of method 2000 may be performed by a base station RACH manager as described with reference to FIGS. 12 through 15. In some examples, a base station 105 may execute a set of codes to control the functional elements of the device to perform the functions described below. Additionally or alternatively, the base station 105 may perform aspects the functions described below using special-purpose hardware.

At block 2005 the base station 105 may identify that a first PRACH transmission received at a first reception time failed to be successfully decoded, the first PRACH message comprising a first control message. The operations of block 2005 may be performed according to the methods described with reference to FIGS. 1 through 11. In certain examples, aspects of the operations of block 2005 may be performed by a PRACH manager as described with reference to FIGS. 12 through 15.

At block 2010 the base station 105 may receive a second PRACH transmission at a second reception time based at least in part on identifying the first PRACH transmission has failed to be successfully decoded, the second PRACH message comprising a second control message. The operations of block 2010 may be performed according to the methods described with reference to FIGS. 1 through 11. In certain examples, aspects of the operations of block 2010 may be performed by a PRACH manager as described with reference to FIGS. 12 through 15.

At block 2015 the base station 105 may identify a common message portion present in both the first PRACH transmission and the second PRACH transmission based at least in part on the first control message and the second control message. The operations of block 2015 may be performed according to the methods described with reference to FIGS. 1 through 11. In certain examples, aspects of the operations of block 2015 may be performed by a characteristics manager as described with reference to FIGS. 12 through 15.

At block 2020 the base station 105 may determine a fixed timing between the first PRACH transmission and the second PRACH transmission based at least in part on the first reception time and the second reception time. The operations of block 2020 may be performed according to the methods described with reference to FIGS. 1 through 11. In certain examples, aspects of the operations of block 2020 may be performed by a characteristics manager as described with reference to FIGS. 12 through 15.

At block 2025 the base station 105 may extract data that is common to both the first PRACH transmission and the second PRACH transmission based at least in part on the common message portion and the fixed timing. The operations of block 2025 may be performed according to the methods described with reference to FIGS. 1 through 11. In certain examples, aspects of the operations of block 2025 may be performed by a data manager as described with reference to FIGS. 12 through 15.

At block 2030 the base station 105 may generate a combined PRACH control message. The operations of block 2030 may be performed according to the methods described with reference to FIGS. 1 through 11. In certain examples, aspects of the operations of block 2030 may be performed by a PRACH manager as described with reference to FIGS. 12 through 15.

Figure 21:
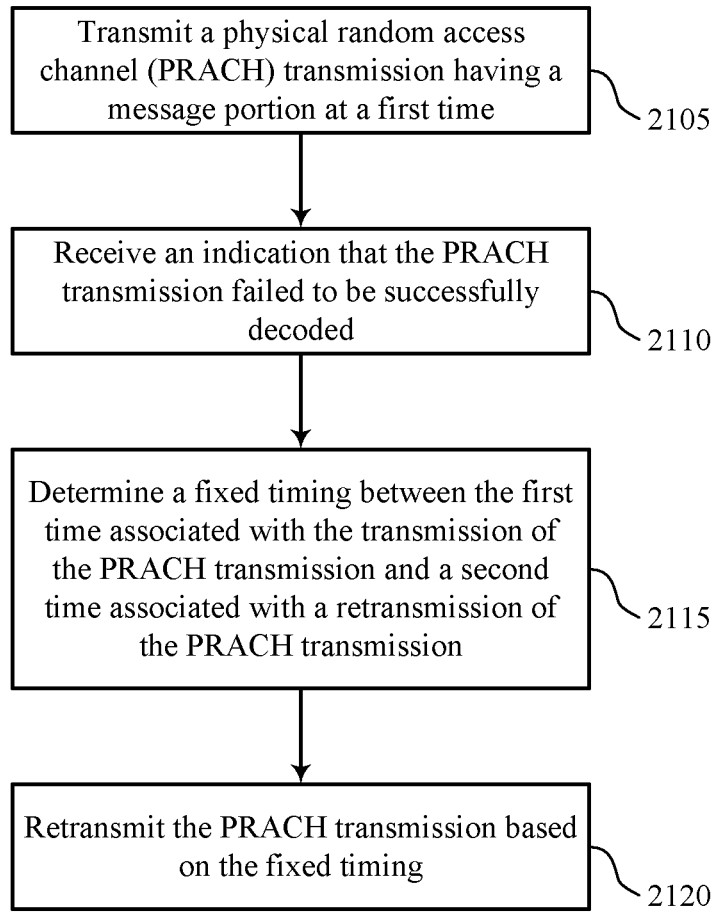

FIG. 21 shows a flowchart illustrating a method 2100 for RACH procedures using multiple PRACH transmissions in accordance with one or more aspects of the present disclosure in accordance with one or more aspects of the present disclosure. The operations of method 2100 may be implemented by a UE 115 or its components as described herein. For example, the operations of method 2100 may be performed by a UE RACH manager as described with reference to FIGS. 16 through 19. In some examples, a UE 115 may execute a set of codes to control the functional elements of the device to perform the functions described below. Additionally or alternatively, the UE 115 may perform aspects the functions described below using special-purpose hardware.

At block 2105 the UE 115 may transmit a PRACH transmission having a message portion at a first time. The operations of block 2105 may be performed according to the methods described with reference to FIGS. 1 through 11. In certain examples, aspects of the operations of block 2105 may be performed by a PRACH manager as described with reference to FIGS. 16 through 19.

At block 2110 the UE 115 may receive an indication that the PRACH transmission failed to be successfully decoded. The operations of block 2110 may be performed according to the methods described with reference to FIGS. 1 through 11. In certain examples, aspects of the operations of block 2110 may be performed by a PRACH manager as described with reference to FIGS. 16 through 19.

At block 2115 the UE 115 may determine a fixed timing between the first time associated with the transmission of the PRACH transmission and a second time associated with a retransmission of the PRACH transmission. The operations of block 2115 may be performed according to the methods described with reference to FIGS. 1 through 11. In certain examples, aspects of the operations of block 2115 may be performed by a characteristics manager as described with reference to FIGS. 16 through 19.

At block 2120 the UE 115 may retransmit the PRACH transmission based at least in part on the fixed timing. The operations of block 2120 may be performed according to the methods described with reference to FIGS. 1 through 11. In certain examples, aspects of the operations of block 2120 may be performed by a PRACH manager as described with reference to FIGS. 16 through 19.

Figure 22:
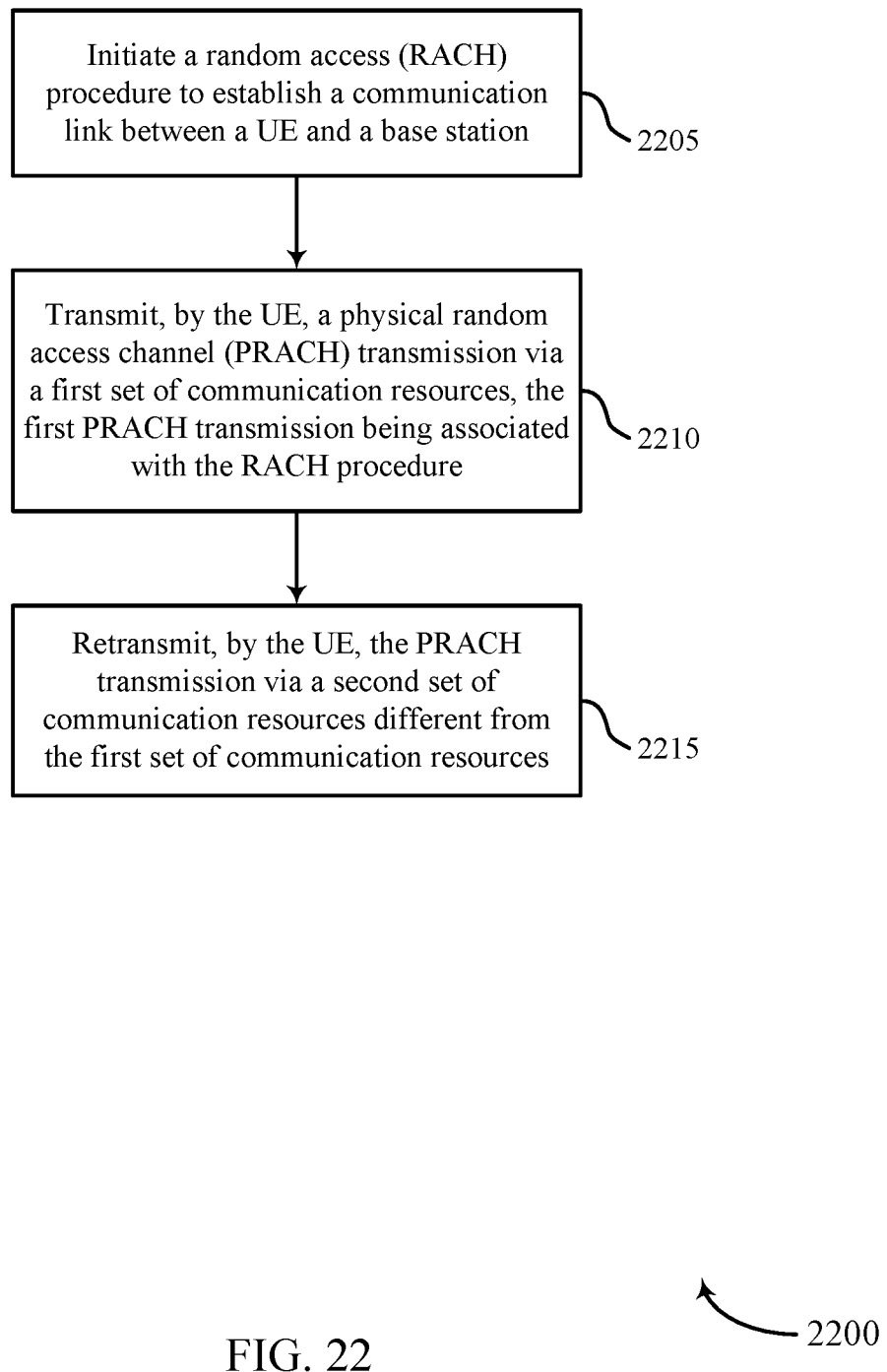

FIG. 22 shows a flowchart illustrating a method 2200 for RACH procedures using multiple PRACH transmissions in accordance with one or more aspects of the present disclosure in accordance with one or more aspects of the present disclosure. The operations of method 2200 may be implemented by a UE 115 or its components as described herein.

For example, the operations of method 2200 may be performed by a UE RACH manager as described with reference to FIGS. 16 through 19. In some examples, a UE 115 may execute a set of codes to control the functional elements of the device to perform the functions described below. Additionally or alternatively, the UE 115 may perform aspects the functions described below using special-purpose hardware.

At block 2205 the UE 115 may initiate a RACH procedure to establish a communication link between a UE and a base station. The operations of block 2205 may be performed according to the methods described with reference to FIGS. 1 through 11. In certain examples, aspects of the operations of block 2205 may be performed by a link manager as described with reference to FIGS. 16 through 19.

At block 2210 the UE 115 may transmit, by the UE, a PRACH transmission via a first set of communication resources, the first PRACH transmission being associated with the RACH procedure. The operations of block 2210 may be performed according to the methods described with reference to FIGS. 1 through 11. In certain examples, aspects of the operations of block 2210 may be performed by a PRACH manager as described with reference to FIGS. 16 through 19.

At block 2215 the UE 115 may retransmit, by the UE, the PRACH transmission via a second set of communication resources different from the first set of communication resources. The operations of block 2215 may be performed according to the methods described with reference to FIGS. 1 through 11. In certain examples, aspects of the operations of block 2215 may be performed by a PRACH manager as described with reference to FIGS. 16 through 19.

Figure 23:
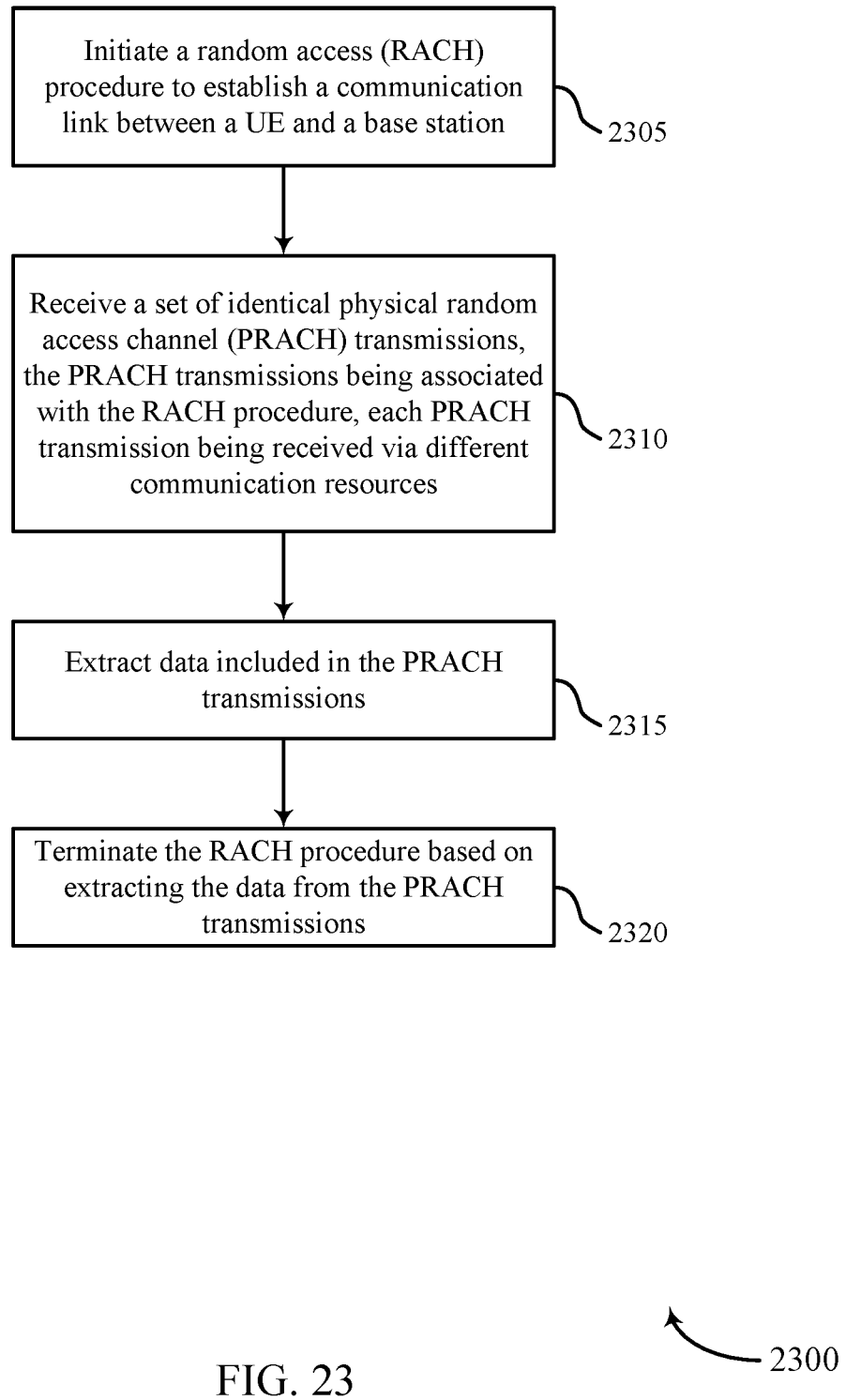

FIG. 23 shows a flowchart illustrating a method 2300 for RACH procedures using multiple PRACH transmissions in accordance with one or more aspects of the present disclosure in accordance with one or more aspects of the present disclosure. The operations of method 2300 may be implemented by a base station 105 or its components as described herein. For example, the operations of method 2300 may be performed by a base station RACH manager as described with reference to FIGS. 12 through 15. In some examples, a base station 105 may execute a set of codes to control the functional elements of the device to perform the functions described below. Additionally or alternatively, the base station 105 may perform aspects the functions described below using special-purpose hardware.

At block 2305 the base station 105 may initiate a RACH procedure to establish a communication link between a UE and a base station. The operations of block 2305 may be performed according to the methods described with reference to FIGS. 1 through 11. In certain examples, aspects of the operations of block 2305 may be performed by a link manager as described with reference to FIGS. 12 through 15.

At block 2310 the base station 105 may receive a plurality of identical PRACH transmissions, the PRACH transmissions being associated with the RACH procedure, each PRACH transmission being received via different communication resources. The operations of block 2310 may be performed according to the methods described with reference to FIGS. 1 through 11. In certain examples, aspects of the operations of block 2310 may be performed by a PRACH manager as described with reference to FIGS. 12 through 15.

At block 2315 the base station 105 may extract data included in the PRACH transmissions. The operations of block 2315 may be performed according to the methods described with reference to FIGS. 1 through 11. In certain examples, aspects of the operations of block 2315 may be performed by a data manager as described with reference to FIGS. 12 through 15.

At block 2320 the base station 105 may terminate the RACH procedure based at least in part on extracting the data from the PRACH transmissions. The operations of block 2320 may be performed according to the methods described with reference to FIGS. 1 through 11. In certain examples, aspects of the operations of block 2320 may be performed by a link manager as described with reference to FIGS. 12 through 15.

Figure 24:
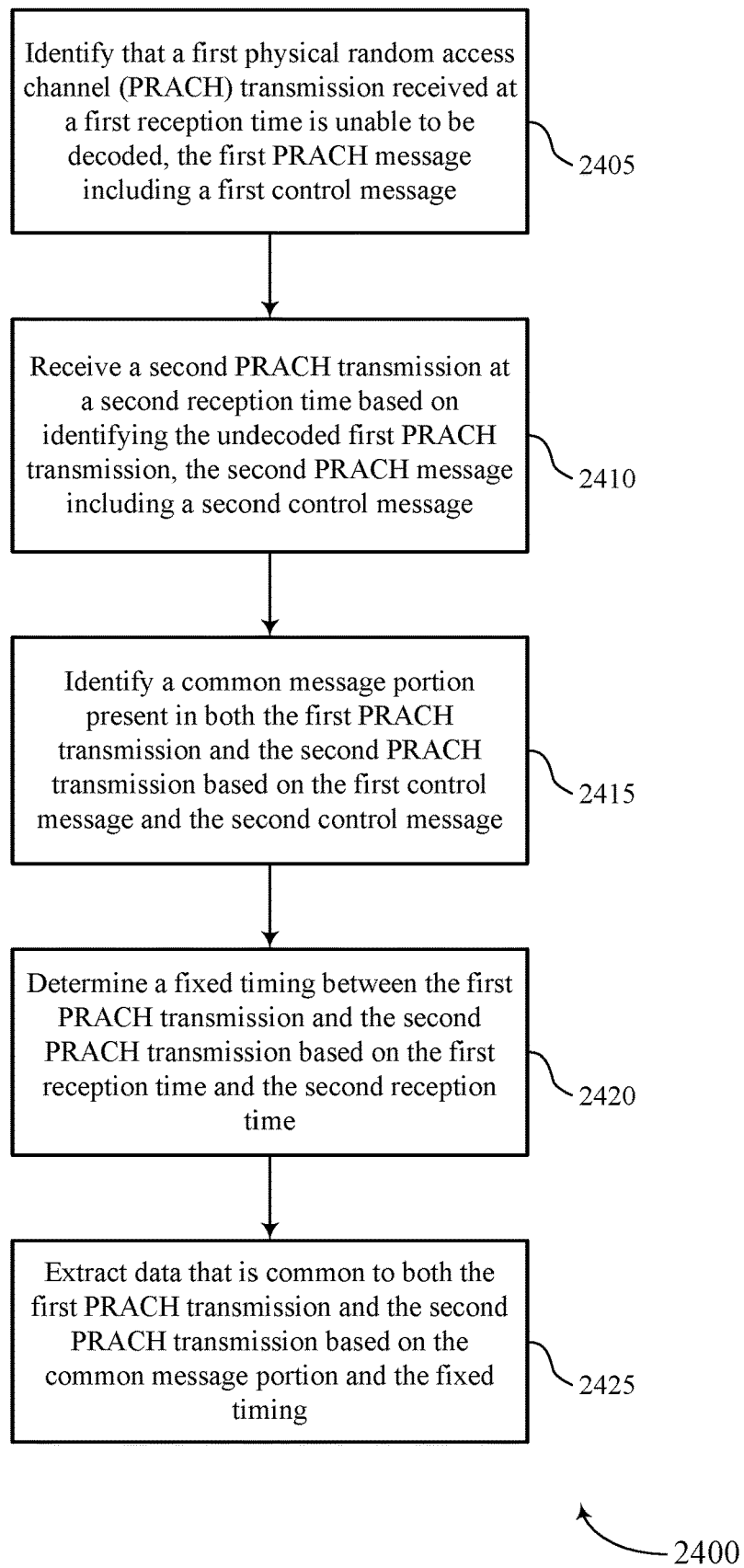

FIG. 24 shows a flowchart illustrating a method 2400 for RACH Procedures Using Multiple PRACH Transmissions in accordance with aspects of the present disclosure. The operations of method 2400 may be implemented by a base station 105 or its components as described herein. For example, the operations of method 2400 may be performed by a base station RACH manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2405 the base station 105 may identify that a first physical random access channel (PRACH) transmission received at a first reception time is unable to be decoded, the first PRACH message comprising a first control message. The operations of block 2405 may be performed according to the methods described herein. In certain examples, aspects of the operations of block 2405 may be performed by a PRACH manager as described with reference to FIGS. 12 through 15.

At block 2410 the base station 105 may receive a second PRACH transmission at a second reception time based at least in part on identifying the undecoded first PRACH transmission, the second PRACH message comprising a second control message. The operations of block 2410 may be performed according to the methods described herein. In certain examples, aspects of the operations of block 2410 may be performed by a PRACH manager as described with reference to FIGS. 12 through 15.

At block 2415 the base station 105 may identify a common message portion present in both the first PRACH transmission and the second PRACH transmission based at least in part on the first control message and the second control message. The operations of block 2415 may be performed according to the methods described herein. In certain examples, aspects of the operations of block 2415 may be performed by a characteristics manager as described with reference to FIGS. 12 through 15.

At block 2420 the base station 105 may determine a fixed timing between the first PRACH transmission and the second PRACH transmission based at least in part on the first reception time and the second reception time. The operations of block 2420 may be performed according to the methods described herein. In certain examples, aspects of the operations of block 2420 may be performed by a characteristics manager as described with reference to FIGS. 12 through 15.

At block 2425 the base station 105 may extract data that is common to both the first PRACH transmission and the second PRACH transmission based at least in part on the common message portion and the fixed timing. The operations of block 2425 may be performed according to the methods described herein. In certain examples, aspects of the operations of block 2425 may be performed by a data manager as described with reference to FIGS. 12 through 15.

Figure 25:
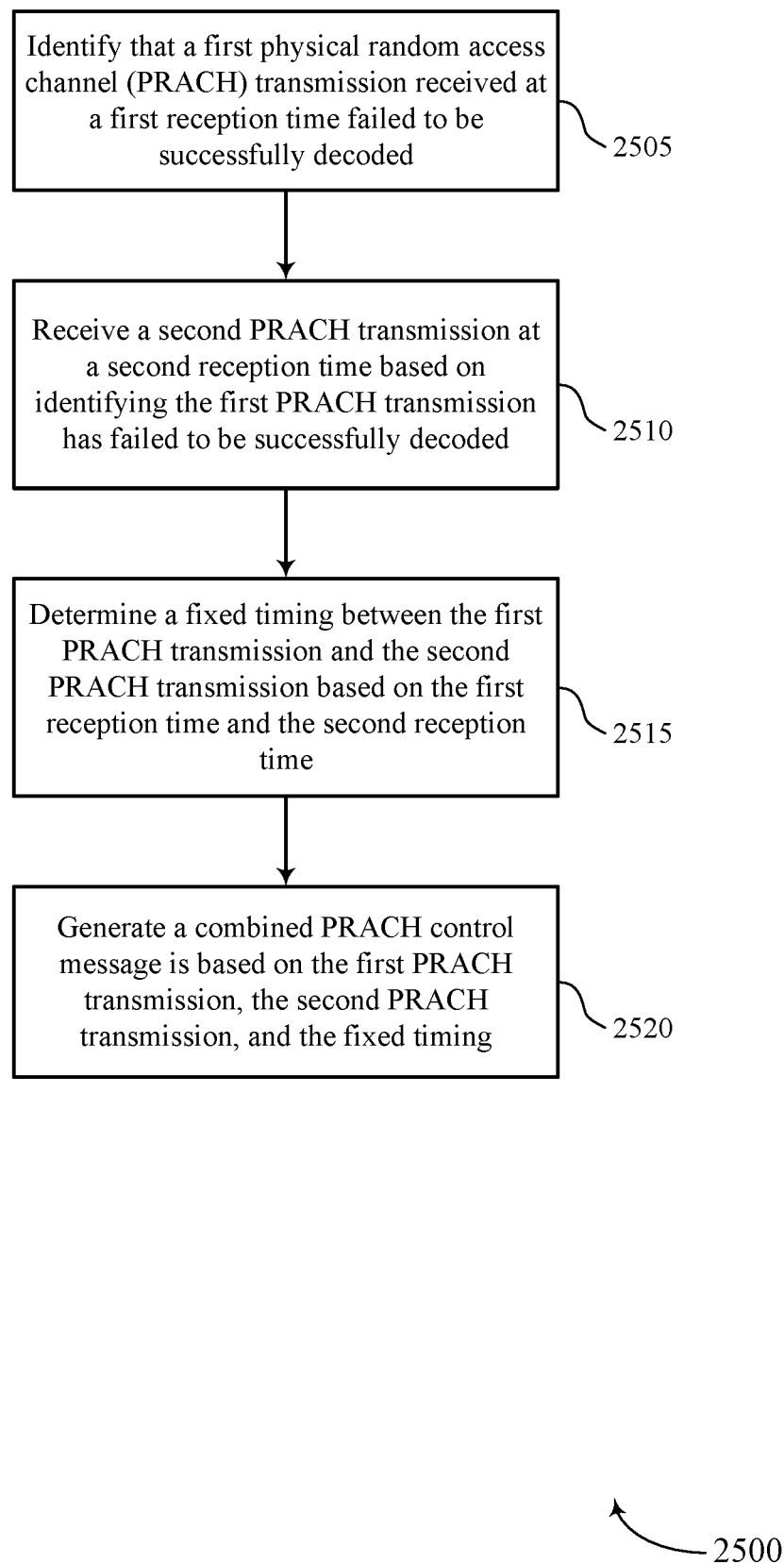

FIG. 25 shows a flowchart illustrating a method 2500 for RACH Procedures Using Multiple PRACH Transmissions in accordance with aspects of the present disclosure. The operations of method 2500 may be implemented by a base station 105 or its components as described herein. For example, the operations of method 2500 may be performed by a base station RACH manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2505 the base station 105 may identify that a first physical random access channel (PRACH) transmission received at a first reception time failed to be successfully decoded. The operations of block 2505 may be performed according to the methods described herein. In certain examples, aspects of the operations of block 2505 may be performed by a PRACH manager as described with reference to FIGS. 12 through 15.

At block 2510 the base station 105 may receive a second PRACH transmission at a second reception time based at least in part on identifying the first PRACH transmission has failed to be successfully decoded. The operations of block 2510 may be performed according to the methods described herein. In certain examples, aspects of the operations of block 2510 may be performed by a PRACH manager as described with reference to FIGS. 12 through 15.

At block 2515 the base station 105 may determine a fixed timing between the first PRACH transmission and the second PRACH transmission based at least in part on the first reception time and the second reception time. The operations of block 2515 may be performed according to the methods described herein. In certain examples, aspects of the operations of block 2515 may be performed by a characteristics manager as described with reference to FIGS. 12 through 15.

At block 2520 the base station 105 may generate a combined PRACH control message is based at least in part on the first PRACH transmission, the second PRACH transmission, and the fixed timing. The operations of block 2520 may be performed according to the methods described herein. In certain examples, aspects of the operations of block 2520 may be performed by a PRACH manager as described with reference to FIGS. 12 through 15.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying that a first physical random access channel (PRACH) transmission received at a first reception time failed to be successfully decoded, the first PRACH transmission including a first control information and a first payload information;
receiving a second PRACH transmission at a second reception time based at least in part on identifying the first PRACH transmission has failed to be successfully decoded, the second PRACH transmission including a second control information and a second payload information;
identifying a common message portion present in both the first PRACH transmission and the second PRACH transmission based at least in part on content of the first control information of the first PRACH transmission and content of the second control information of the second PRACH transmission;
determining a fixed timing between the first PRACH transmission and the second PRACH transmission based at least in part on the first reception time and the second reception time;
extracting data that is common to both the first PRACH transmission and the second PRACH transmission based at least in part on the common message portion and the fixed timing; and
generating a combined PRACH control message based at least in part on combining content of the first control information of the first PRACH transmission and content of the second control information of the second PRACH transmission.

2. The method of claim 1, further comprising:
initiating a contention-free random access procedure, wherein extracting the data is based at least in part on initiating the contention-free random access procedure.

3. The method of claim 1, wherein generating the combined PRACH control message is based at least in part on the first PRACH transmission, the second PRACH transmission, the common portion, and the fixed timing, wherein extracting the data is based at least in part on the combined PRACH control message.

4. The method of claim 1, wherein identifying the common message portion further comprises:
determining that the first control information of the first PRACH transmission is the same as the second control information of the second PRACH transmission.

5. The method of claim 1, wherein identifying the common message portion further comprises:
determining that a type of the first PRACH transmission is the same as a type of the second PRACH transmission, wherein extracting the data is based at least in part on the determining.

6. The method of claim 1, wherein identifying the common message portion further comprises:
identifying a location of the first control information in the first PRACH transmission; and
the method further comprising identifying a location of the second control information in the second PRACH transmission, wherein extracting the data is based at least in part on the location of the first control information being the same as the location of the second control information.

7. The method of claim 1, further comprising:
identifying a number of received PRACH transmissions; and
terminating the RACH procedure based at least in part on the number of received PRACH transmissions being equal to or greater than a threshold number of PRACH transmissions.

8. The method of claim 1, further comprising:
initiating a random access (RACH) procedure to establish a communication link between a user equipment (UE) and a cell of a base station; and
transmitting a PRACH transmission schedule having a plurality of PRACH transmission opportunities based at least in part on the initiating, wherein extracting the data is based at least in part on the PRACH transmission schedule.

9. The method of claim 1, wherein:
the first PRACH transmission or the second PRACH transmission are mapped into one or more self-contained uplink slots, wherein each of the one or more self-contained uplink slots comprises at least the first control information and the first payload information of the first PRACH transmission or the second control information and the second payload information of the second PRACH transmission.

10. The method of claim 1, wherein:
the first PRACH transmission and the second PRACH transmission are based at least in part on an outer loop power control.

11. The method of claim 1, wherein:
a transmission power of the second PRACH transmission is greater than a transmission power of the first PRACH transmission.

12. The method of claim 1, further comprising:
receiving a third PRACH transmission based at least in part on the second PRACH transmission failing to be successfully decoded.

13. The method of claim 1, wherein:
the combined PRACH control message is based at least in part on the first PRACH transmission received during a first uplink slot and the second PRACH transmission received during a second uplink slot different from the first uplink slot.

14. A method for wireless communication, comprising:
initiating a random access (RACH) procedure to establish a communication link between a user equipment (UE) and a base station;
transmitting, by the UE, a first physical random access channel (PRACH) transmission via a first set of communication resources, the first PRACH transmission being associated with the RACH procedure, the first PRACH transmission including a first control information and a first payload information;
transmitting, by the UE, a second PRACH transmission via a second set of communication resources different from the first set of communication resources, the second PRACH transmission including a second control information and a second payload information; and
linking the first PRACH transmission and the second PRACH transmission such that the base station is configured to combine the first PRACH transmission and the second PRACH transmission based at least in part on combining content of the first control information and content of the second control information.

15. The method of claim 14, wherein:
the first set of communication resources is a first uplink slot and the second set of communication resources is a second uplink slot that is different from the first uplink slot.

16. The method of claim 14, further comprising:
mapping the first PRACH transmission or the second PRACH transmission to one or more uplink-centric slots, wherein each of the one or more uplink-centric slots comprises at least the first control information and the first payload information of the first PRACH transmission or the second control information and the second payload information of the second PRACH transmission.

17. The method of claim 14, wherein:
the first set of communication resources is a first frequency sub-band of a slot and the second set of communication resources is second frequency sub-band of the slot, the second frequency sub-band being different from the first frequency sub-band.

18. The method of claim 14, wherein:
the first set of communication resources comprises a first slot and a first frequency sub-band of the first slot; and
the second set of communication resources comprises a second slot different from the first slot and a second frequency sub-band of the second slot different from the first frequency sub-band.

19. The method of claim 14, further comprising:
receiving an indication from the base station indicating that the second PRACH transmission has been decoded successfully; and
terminating RACH procedure based at least in part on the second PRACH transmission being decoded successfully.

20. The method of claim 14, further comprising:
receiving a transmission schedule that includes a plurality of PRACH transmission opportunities associated with the RACH procedure; and
transmitting a PRACH transmission during each PRACH transmission opportunity in the transmission schedule.

21. A method for wireless communication, comprising:
initiating a random access (RACH) procedure to establish a communication link between a user equipment (UE) and a base station;
receiving a plurality of identical physical random access channel (PRACH) transmissions, each PRACH transmission being received via different communication resources, the PRACH transmissions including control information and payload information;
determining the PRACH transmissions are associated with the RACH procedure based at least in part on content of the control information of each PRACH transmission;
generating a combined PRACH control message based at least in part on combining content of the control information of each of the PRACH transmissions;
extracting data included in the PRACH transmissions; and
terminating the RACH procedure based at least in part on extracting the data from the PRACH transmissions.

22. The method of claim 21, further comprising:
identifying a number of received PRACH transmissions, wherein terminating the RACH procedure is based at least in part on the number of received PRACH transmissions being equal to or greater than a threshold number of PRACH transmissions.

23. The method of claim 21, further comprising:
generating a RACH response message based at least in part on extracting data included in the PRACH transmissions; and
transmitting the RACH response message.

24. The method of claim 21, wherein:
extracting the data further comprises: extracting data from one of the plurality of identical PRACH transmissions received.

25. The method of claim 21, wherein generating the combined PRACH control message further comprises:
generating the combined PRACH control message based at least in part on the plurality of identical PRACH transmissions received, wherein extracting the data is based at least in part on the combined PRACH control message.

26. A method for wireless communication, comprising:
identifying that a first physical random access channel (PRACH) transmission received at a first reception time is unable to be decoded, the first PRACH transmission including a first control information and a first payload information;
receiving a second PRACH transmission at a second reception time based at least in part on identifying the undecoded first PRACH transmission, the second PRACH transmission including a second control information and a second payload information;
identifying a common message portion present in both the first PRACH transmission and the second PRACH transmission based at least in part on content of the first control information of the first PRACH transmission and content of the second control information of the second PRACH transmission;
determining a fixed timing between the first PRACH transmission and the second PRACH transmission based at least in part on the first reception time and the second reception time;
extracting data that is common to both the first PRACH transmission and the second PRACH transmission based at least in part on the common message portion and the fixed timing; and
generating a combined PRACH control message based at least in part on combining content of the first control information of the first PRACH transmission and content of the second control information of the second PRACH transmission.

27. An apparatus for wireless communication, comprising:
a processor;
memory in electronic communication with the processor; and
the processor and memory configured to:
identify that a first physical random access channel (PRACH) transmission received at a first reception time failed to be successfully decoded, the first PRACH transmission including a first control information and a first payload information;
receive a second PRACH transmission at a second reception time based at least in part on identifying the first PRACH transmission has failed to be successfully decoded, the second PRACH transmission including a second control information and a second payload information;
identify a common message portion present in both the first PRACH transmission and the second PRACH transmission based at least in part on content of the first control information of the first PRACH transmission and content of the second control information of the second PRACH transmission;

determine a fixed timing between the first PRACH transmission and the second PRACH transmission based at least in part on the first reception time and the second reception time;

extract data that is common to both the first PRACH transmission and the second PRACH transmission based at least in part on the common message portion and the fixed timing; and generate a combined PRACH control message based at least in part on combining content of the first control information of the first PRACH transmission and content of the second control information of the second PRACH transmission.

28. The apparatus of claim 27, wherein the processor and memory are further configured to:
initiate a contention-free random access procedure, wherein extracting the data is based at least in part on initiating the contention-free random access procedure.

29. The apparatus of claim 27, wherein the processor and memory are further configured to:
generate the combined PRACH control message based at least in part on the first PRACH transmission, the second PRACH transmission, the common portion, and the fixed timing, wherein extracting the data is based at least in part on the combined PRACH control message.

30. The apparatus of claim 27, wherein the processor and memory are further configured to:
identify a number of received PRACH transmissions; and
terminate the RACH procedure based at least in part on the number of received PRACH transmissions being equal to or greater than a threshold number of PRACH transmissions.

31. The apparatus of claim 27, wherein the processor and memory are further configured to:
initiate a random access (RACH) procedure to establish a communication link between a user equipment (UE) and a cell of a base station; and
transmit a PRACH transmission schedule having a plurality of PRACH transmission opportunities based at least in part on the initiating, wherein extracting the data is based at least in part on the PRACH transmission schedule.

32. The apparatus of claim 27, wherein:
the first PRACH transmission or the second PRACH transmission are mapped into one or more self-contained uplink slots, wherein each of the one or more self-contained uplink slots comprises at least the first control information and the first payload information of the first PRACH transmission or the second control information and the second payload information of the second PRACH transmission.

33. The apparatus of claim 27, wherein:
the combined PRACH control message is based at least in part on the first PRACH transmission received during a first uplink slot and the second PRACH transmission received during a second uplink slot different from the first uplink slot.

* * * * *